United States Patent
Agren

(10) Patent No.: US 8,320,410 B2
(45) Date of Patent: Nov. 27, 2012

(54) SYNCHRONIZATION OF MEDIA DATA STREAMS WITH SEPARATE SINKS USING A RELAY

(75) Inventor: Mattias Per Agren, Lund (SE)

(73) Assignee: Broadcom Corporation, Irvine, CA (US)

( * ) Notice: Subject to any disclaimer, the term of this patent is extended or adjusted under 35 U.S.C. 154(b) by 1001 days.

(21) Appl. No.: 12/125,739

(22) Filed: May 22, 2008

(65) Prior Publication Data

US 2008/0291863 A1 Nov. 27, 2008

Related U.S. Application Data

(63) Continuation-in-part of application No. 11/752,880, filed on May 23, 2007.

(51) Int. Cl.
*H04J 3/06* (2006.01)
(52) U.S. Cl. ........ 370/503; 370/350; 370/506; 370/507; 370/508; 370/509; 370/510; 370/512; 370/514; 370/517; 370/519
(58) Field of Classification Search .................. 370/350, 370/503, 506–510, 512, 514, 517, 519
See application file for complete search history.

(56) References Cited

U.S. PATENT DOCUMENTS

| | | | | |
|---|---|---|---|---|
| 6,542,754 | B1* | 4/2003 | Sayers et al. ................. | 455/502 |
| 8,102,836 | B2 | 1/2012 | Jerlhagen et al. | |
| 8,159,957 | B2* | 4/2012 | Hannel et al. ................. | 370/241 |
| 2003/0235179 | A1* | 12/2003 | Tuomela et al. .............. | 370/347 |
| 2004/0228367 | A1 | 11/2004 | Mosig | |
| 2004/0258047 | A1 | 12/2004 | Miao | |
| 2005/0070225 | A1* | 3/2005 | Lee .............................. | 455/41.3 |
| 2005/0152330 | A1 | 7/2005 | Stephens et al. | |
| 2005/0259754 | A1* | 11/2005 | Ho et al. .................. | 375/240.28 |
| 2006/0221936 | A1 | 10/2006 | Rauchwerk | |
| 2007/0009071 | A1 | 1/2007 | Singh | |

(Continued)

FOREIGN PATENT DOCUMENTS

EP 1398931 A1 3/2004

(Continued)

OTHER PUBLICATIONS

"Specification of the Bluetooth System: Master Table of Contents & Compliance Requirements", Covered Core Package version: 2.0+ EDR, (Nov. 4, 2004),1230 pages.

(Continued)

*Primary Examiner* — Nishant B Divecha
*Assistant Examiner* — Jay P Patel
(74) *Attorney, Agent, or Firm* — Piala & Weaver P.L.L.C.

(57) ABSTRACT

Relay devices and sink devices that provide synchronized audio and/or video outputs are described. A relay device receives a first communication packet from a source device. The first communication packet includes a data frame. A timestamp is generated. The timestamp is an estimate of a time at which content defined by the data frame will be "played." A second communication packet is generated that includes the data frame and the generated timestamp. The second communication packet is transmitted from the relay device. In one implementation, the generated timestamp is received by a plurality of sink devices, and is used to synchronize output signals (e.g., sound and/or video images) of the sink devices. In another implementation, the generated timestamp is received by a sink device, and is used to synchronize an output signal of the sink device with an output signal of the relay device.

20 Claims, 19 Drawing Sheets

U.S. PATENT DOCUMENTS

| | | | |
|---|---|---|---|
| 2007/0058762 A1 | 3/2007 | Hudson et al. | |
| 2007/0232222 A1 | 10/2007 | de Jong | |
| 2008/0040759 A1 | 2/2008 | She et al. | |
| 2008/0122986 A1* | 5/2008 | Diederichsen | 348/705 |
| 2008/0242229 A1 | 10/2008 | Sharma | |
| 2008/0279162 A1* | 11/2008 | Desai | 370/338 |
| 2008/0291891 A1 | 11/2008 | Jerlhagen et al. | |

FOREIGN PATENT DOCUMENTS

| | | |
|---|---|---|
| WO | 2006110960 A1 | 10/2006 |

OTHER PUBLICATIONS

European Search Report for App. No. 08009038.4 dated Oct. 19, 2010, 4 pages.

* cited by examiner

SYNCHRONIZATION OF MEDIA DATA STREAMS WITH SEPARATE SINKS USING A RELAY

This application is a continuation-in-part of U.S. Ser. No. 11/752,880, filed May 23, 2007, which is herein incorporated by reference in its entirety

BACKGROUND OF THE INVENTION

1. Field of the Invention

The present invention relates to the synchronization of sink devices that receive data, such as audio and/or video data, wirelessly streamed by a source and/or a relay device.

2. Background Art

Wireless communication protocols, such as the BLUETOOTH protocol, enable a variety of types of data streams to be provided by source devices to sink devices in a wireless fashion. For example, audio and video data may be streamed by the source devices to the sink devices. However, in cases where related data is streamed to multiple sink devices by a source device, it may be difficult to synchronize the processing and outputting of the data by the sink devices. For example, audio data may be transmitted by a music player to wireless speakers. It is desirable for the audio outputs of the speakers to be synchronized so that the audio may be heard clearly, and in stereo, by a listener. In another example, video data may be transmitted by a video source to wireless video display devices. It may be desirable that the video image streams output by the video display devices be synchronized. In still another example, a media source may transmit audio data to one or more wireless speakers and video data to one or more wireless display devices. It may be desirable that the audio sound and video image streams output by the speaker(s) and display(s) be synchronized for synchronized listening and viewing by the audience.

Thus, what is desired are ways of synchronizing the output of data streamed to sink devices in a wireless fashion.

BRIEF SUMMARY OF THE INVENTION

Methods, systems, and apparatuses for synchronizing one or more output/sink devices are described. Each sink device receives a stream of data from a source device. In each sink device, a data output latency is determined, and is compared against a desired data output latency, to determine a latency difference. A rate of data output by each sink device is adjusted according to the determined latency difference, to synchronize a timing of data output across the sink devices.

In an example aspect, each sink device executes a similar process: a communication packet is received from the source device. The communication packet includes data and a source clock timestamp. A local clock signal is generated that is synchronized with a source clock signal of the source device. The data is decoded using a codec. At least one delay and the source clock timestamp are subtracted from a current value of the local clock signal to generate a local latency value. A difference between a desired latency value and the local latency value is determined. A rate of a clock signal of the codec is adjusted according to the determined difference.

In a further example aspect of the present invention, an output system for data streamed from a source device is provided. The output system includes one or more output/sink devices, each sink device including a radio frequency (RF) communication module, a local clock signal generator, a codec, an output element, and a latency calculator. For each sink device, the RF communication module is configured to receive a communication packet from a source device. The communication packet includes data and a source clock timestamp. The local clock signal generator is configured to generate a local clock signal synchronized with a source clock signal of the source device. The codec is configured to decode the data, and to optionally convert the decoded data to analog form. The output element is configured to receive the decoded data and generate an output signal. The latency calculator is configured to subtract at least one delay and the source clock timestamp from a current value of the local clock signal to generate a local latency value. The latency calculator further determines a difference between a desired latency value and the local latency value. A rate of the codec clock signal is adjusted according to the determined difference.

In aspects, the data may be audio data, video data, or other type(s) of data. The output element for each sink device may be a speaker, a display device, or other type of output element. A variety of communication protocols may be used for communications between the source device and sink device(s), such as the BLUETOOTH protocol. When the source and sink device(s) are configured to communicate according to the BLUETOOTH protocol, the source clock signal may be the BLUETOOTH master clock, and the local clock signal(s) may be BLUETOOTH slave clock(s).

In further aspects of the present invention, relay devices and sink devices that provide synchronized audio and/or video outputs are described. A relay device receives a first communication packet that includes a data frame from a source device. A timestamp is generated. The timestamp is an estimate of a time at which content defined by the data frame will be "played." A second communication packet is generated that includes the data frame and the generated timestamp. The second communication packet is transmitted from the relay device. In one implementation, the generated timestamp is received by a plurality of sink devices, and is used to synchronize output signals of the sink devices. In another implementation, the generated timestamp is received by a sink device, and is used to synchronize an output signal of the sink device with an output signal of the relay device.

In an example aspect, a relay device includes a communication module and a timestamp calculator. The communication module is configured to enable wireless communications. The communication module is configured to receive a first communication packet that includes a data frame from a remote source device. The timestamp calculator is configured to estimate a time delay for the data frame to be decoded by a codec, and to add the estimated time delay to a time that a previous data frame was output by a codec (e.g., a codec of the relay device, or other codec) to generate a timestamp. The communication module is configured to transmit a second communication packet that includes the data frame and the generated timestamp. The generated timestamp is configured to be used by a plurality of sink devices that receive the second communication packet to synchronize output signals generated by output elements of the sink devices.

In another example aspect, a relay device includes a communication module, a codec, a timestamp calculator, and an output element. The communication module is configured to receive a first communication packet that includes a data frame from a remote source device. The codec includes a frame buffer configured receive the data frame. The codec is configured to decode the data frame after the data frame passes through the frame buffer. The timestamp calculator is configured to estimate a time delay for the data frame to be decoded by the codec, and to add the estimated time delay to a time that a previous data frame was output by a codec, to generate a timestamp. The communication module is configured to transmit a second communication packet that includes the data frame and the generated timestamp. The output element is configured to receive the decoded data frame and to generate a first output signal based on the decoded frame data. A sink device receives the second communication packet, and uses the timestamp to synchronize a second output signal generated by an output element of the sink device with the first output signal.

In another example aspect, a sink device includes a communication module, a codec, and an output element. The communication module is configured to receive a communication packet that includes a data frame and a timestamp. The codec includes a frame buffer configured receive the data frame. The codec is configured to decode the data frame after the data frame passes through the frame buffer. The codec is configured to provide the decoded data frame to the output element at a time indicated by the timestamp. The output element is configured to receive the decoded data frame and to generate a first output signal based on the decoded frame data. The first output signal is substantially synchronized with a second output signal generated by an output element of a second device (e.g., a relay device or a second sink device) based on the data frame.

These and other objects, advantages and features will become readily apparent in view of the following detailed description of the invention. Note that the Summary and Abstract sections may set forth one or more, but not all exemplary embodiments of the present invention as contemplated by the inventor(s).

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

Figure 1:
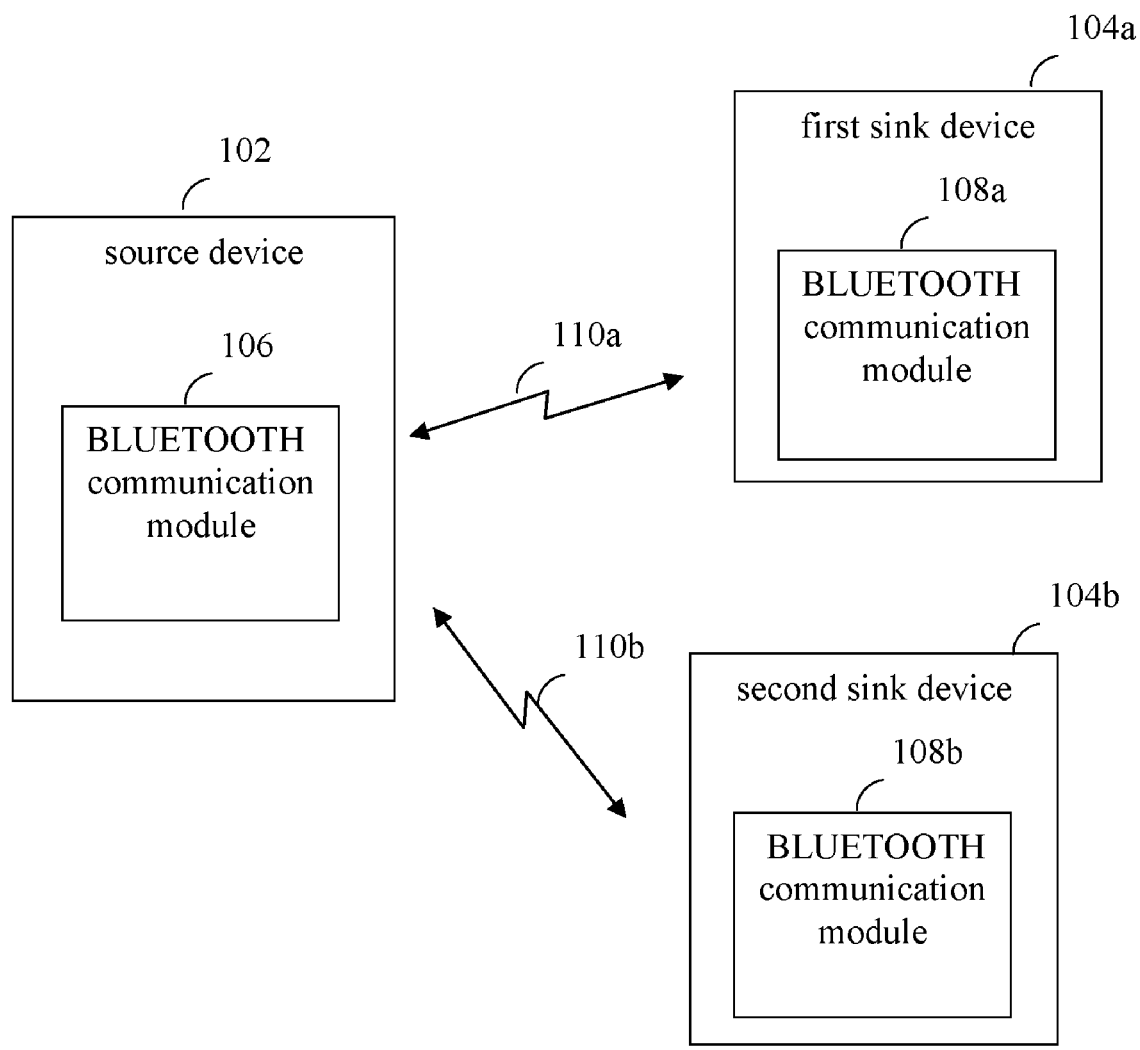
FIGS. 1 and 2 show block diagram views of an example BLUETOOTH wireless communications system.

The present invention will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE INVENTION

Introduction

The present specification discloses one or more embodiments that incorporate the features of the invention. The disclosed embodiment(s) merely exemplify the invention. The scope of the invention is not limited to the disclosed embodiment(s). The invention is defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Furthermore, it should be understood that spatial descriptions (e.g., "above," "below," "up," "left," "right," "down," "top," "bottom," "vertical," "horizontal," etc.) used herein are for purposes of illustration only, and that practical implementations of the structures described herein can be spatially arranged in any orientation or manner.

Example Wireless Communication Systems

A variety of wireless communication protocols exist that enable devices to communicate in a wireless fashion. For example, FIG. 1 shows an example BLUETOOTH wireless communication system 100. As shown in FIG. 1, system 100 includes a source device 102, a first sink device 104*a*, and a second sink device 104*b*. Source device 102 may be any type of device, mobile or immobile, that is configured to provide a stream of data to one or more sink devices 104, such as a pair of sink devices 104*a* and 104*b*. For example, source device 102 may be an audio source device such as a music player (e.g., an MP3 player, an APPLE IPOD, etc.) or mobile phone (e.g., a cell phone), a video source device (e.g., a cable box that supplies digital video, an analog video signal receiver or tuner, etc.) a mixed media source device (e.g., a stereo receiver that sources video and audio), or a device (e.g., a computer system) that sources other types of data streams.

Sink devices 102 may be any type of device that receives and processes a received data stream, such as a wireless speaker (e.g., an earphone or headset speaker, a home audio speaker, etc.), a wireless display device (e.g., a wireless flat screen television, including a high-definition television), or other device.

As shown in FIG. 1, source device 102 includes a BLUETOOTH communication module 106, first sink device 104a includes a BLUETOOTH communication module 108a, and second sink device 104b includes a BLUETOOTH communication module 108b. BLUETOOTH communication module 106 enables master device 102 to communicate with first and second sink devices 104a and 104b according to a BLUETOOTH communication protocol. BLUETOOTH communication module 106 communicates with BLUETOOTH communication module 108a using a first communication channel 110a, and communicates with BLUETOOTH communication module 108b of second sink device 104b using a second communication channel 110b. For example, first and second communication channels 110a and 110b may each include RF communication signals transmitted in a unicast (point-to-point; uni- or bi-directional) channel manner between source device 102 and a respective, designated one of first and second sink devices 104a and 104b. Alternatively, first and second communication channels 110a and 110b may be broadcast (unidirectional) channels between source device 102 and first and second sink devices 104a and 104b.

Figure 2:
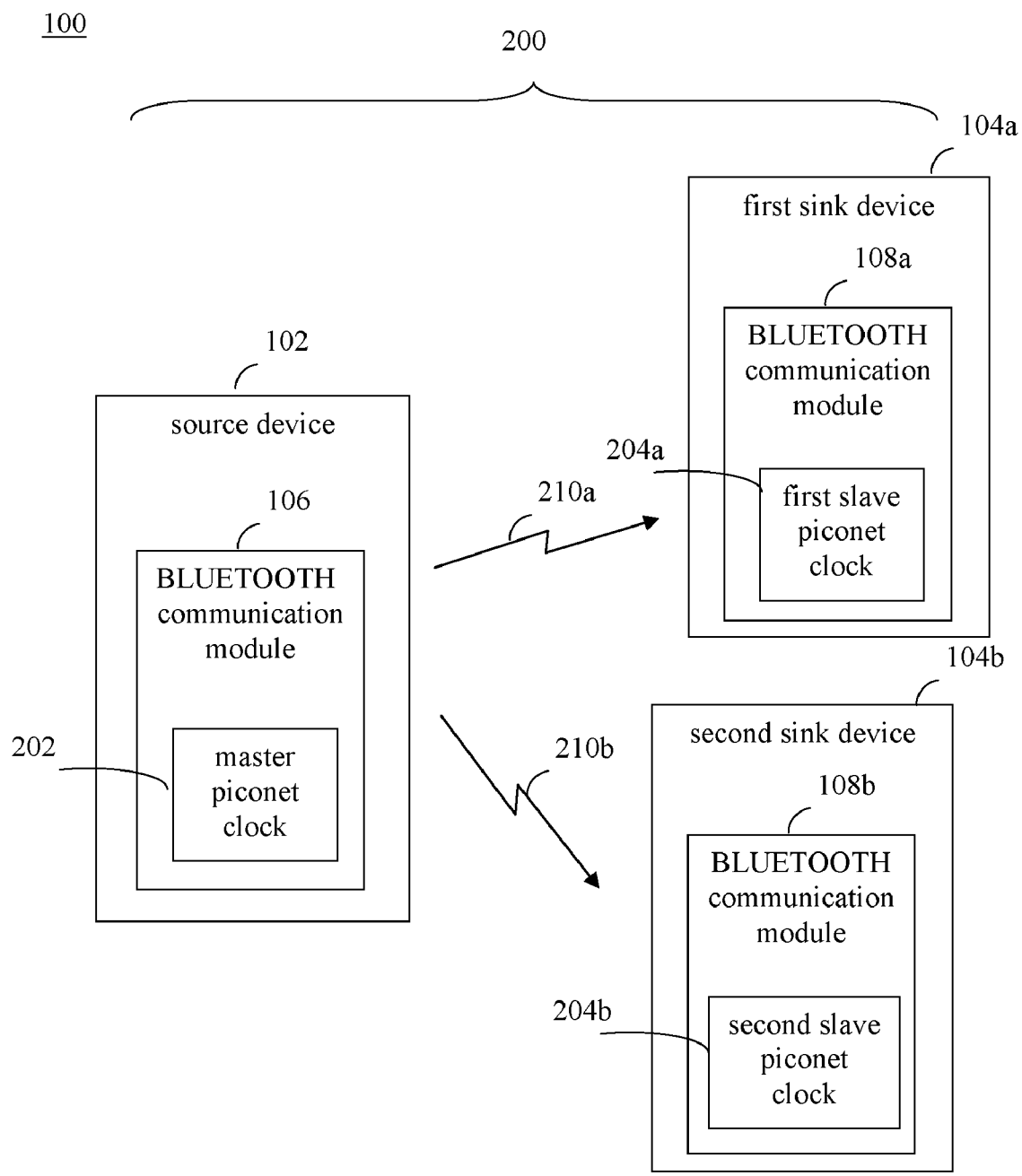

For example, FIG. 2 shows BLUETOOTH communication module 106 communicating with BLUETOOTH communication modules 108a and 108b to form a BLUETOOTH piconet 200 that includes source device 102, first sink device 104a, and second sink device 104b. In the example of FIG. 2, source device 102 is a "master" device of piconet 200, and first and second sink devices 104a and 104b are "slave" devices of piconet 200. Although a pair of slave devices 104a and 104b are shown in FIG. 2 for illustrative purposes, additional slave devices 104 may be present in piconet 200. For example, a current BLUETOOTH specification allows for up to seven slave devices. Embodiments are applicable to any number of slave devices, including a number of slaves up to a limit allowed by a relevant protocol specification.

As shown in FIG. 2, BLUETOOTH communication module 106 of source device 102 includes a master piconet clock 202. BLUETOOTH communication module 108a of first sink device 104a includes a first slave piconet clock 204a, and BLUETOOTH communication module 108b of second sink device 104b includes a second slave piconet clock 204b. Clocks 202, 204a and 204b have a common frequency according to the BLUETOOTH specification (e.g., a 625 μsec period).

When BLUETOOTH devices first connect as in FIG. 2, a value of the master device clock and the device address (BD ADDR) of the master device are passed to the slave devices in a special packet called a frequency-hop synchronization packet (FHS packet). In FIG. 2, first communication channel 110a includes a synchronization packet 210a transmitted by source device 102 to first sink device 104a, and second communication channel 110b includes a synchronization packet 210b transmitted by source device 102 to second sink device 104b. Synchronization packets 210a and 210b are frequency-hop synchronization packets that synchronize sink devices 104a and 104b with source device 102.

Figure 3:
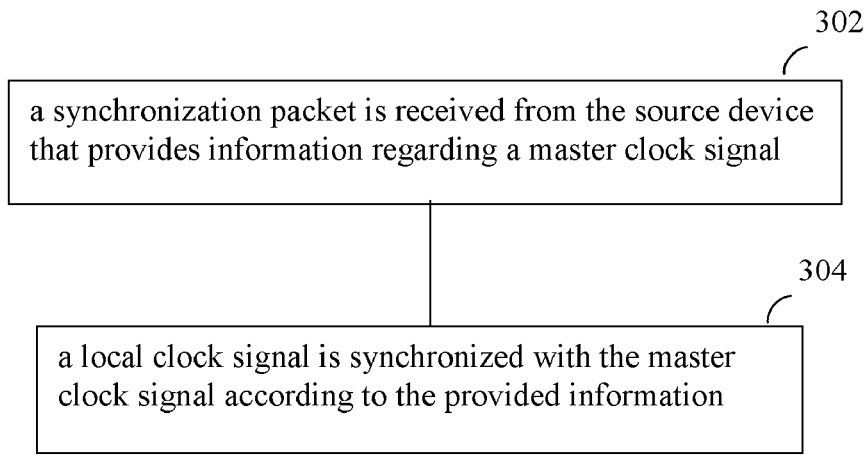
FIG. 3 shows a flowchart for synchronization of devices in a BLUETOOTH piconet.
Figure 4:
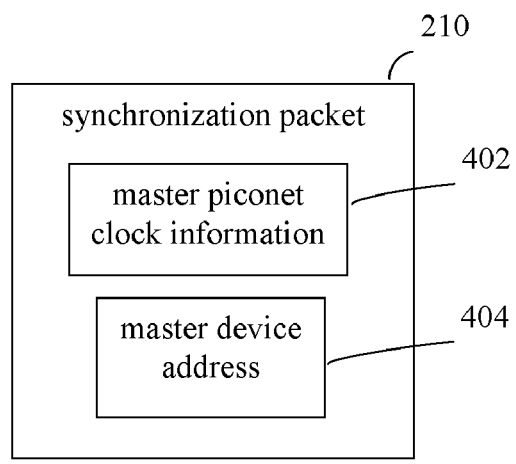
FIG. 4 shows an example synchronization packet.

A flowchart 300 shown in FIG. 3 illustrates this synchronization process. In step 302 of flowchart 300, a synchronization packet is received from the master device that provides information regarding the master clock signal. For example, as shown in FIG. 2, synchronization packets 210a and 210b are received by first and second sink devices 104a and 104b from source device 102, each including a synchronization packet. FIG. 4 shows an example synchronization packet 210. As shown in FIG. 4, synchronization packet 210 includes a master piconet clock information 402 and a master device address 404. Master piconet clock information 402 includes information regarding master piconet clock 202 of source device 102, such as a current clock value of master piconet clock 202. Master device address 404 is the device address (BD ADDR) of source device 102.

In step 304 of flowchart 300, a local (slave) clock signal is synchronized with the master clock signal according to the provided information. For example, in FIG. 2, first slave piconet clock 204a is synchronized with master piconet clock 202 using the master piconet clock information 402 received in synchronization packet 210a. For example, the current clock value of master piconet clock 202 provided by master piconet clock information 402 may be stored in first slave piconet clock 204a and in second slave piconet clock 204b. According to current BLUETOOTH standards, master and slave clocks can be very closely synchronized, such as to about 1 μsec.

Master device address 404 of source device 102 is used in sink devices 104a and 104b to calculate a sequence of frequency hops that all devices in piconet 200 will follow. The current value of master piconet clock 202 decides which is the current hop in the sequence (the phase). All sink devices in a piconet keep track of a difference between their own native clock (e.g., slave piconet clock 204) and the clock of the master (master piconet clock 202 via master piconet clock information 402), so they know exactly which frequency to transmit or receive on at any moment. Source device 102 and sink devices 104a and 104b communicate with each other at the various frequencies to which they synchronously hop. Further description regarding the BLUETOOTH protocol may be found in "Specification of the Bluetooth System," Bluetooth Specification Version 2.0+EDR (vol 0-vol 4), copyright 2004, 1230 pages, which is incorporated herein by reference in its entirety.

According to the BLUETOOTH protocol described above, a data stream may be provided by source device 102 to sink devices in a wireless fashion. Embodiments of the present invention further described below are applicable to the BLUETOOTH protocol, and to other wireless communication protocols. In this manner, audio, video, and other types of data may be streamed by source device 102 to sink devices 104a and 104b. In some cases, it may be difficult to synchronize the outputting of the data by the sink devices. For instance, in the example of FIG. 2, it may be desirable for first and second sink devices 104a and 104b to play audio and/or display video in a synchronized fashion. When both of devices 104a and 104b play synchronized audio, it is desired that a listener hear the audio in stereo without distortion. When devices 104a and 104b respectively play audio and display a video image stream, it is desired that the audio and video be matched in time.

Thus, what is needed are ways of synchronizing the outputs of sink devices. Embodiments of the present invention are described below that enable parallel, synchronized data to be output by multiple sink devices. Such embodiments may be implemented in BLUETOOTH and other types of communication systems.

Example Embodiments.

The example embodiments described herein are provided for illustrative purposes, and are not limiting. The examples described herein may be adapted to any type of wireless data source and sink devices. Example embodiments are described below with respect to the BLUETOOTH protocol. However, embodiments may use communications protocols other than BLUETOOTH, as would be known to persons skilled in the relevant art(s) from the teachings herein. Furthermore, additional structural and operational embodiments, including modifications/alterations, will become apparent to persons skilled in the relevant art(s) from the teachings herein.

Figure 5:
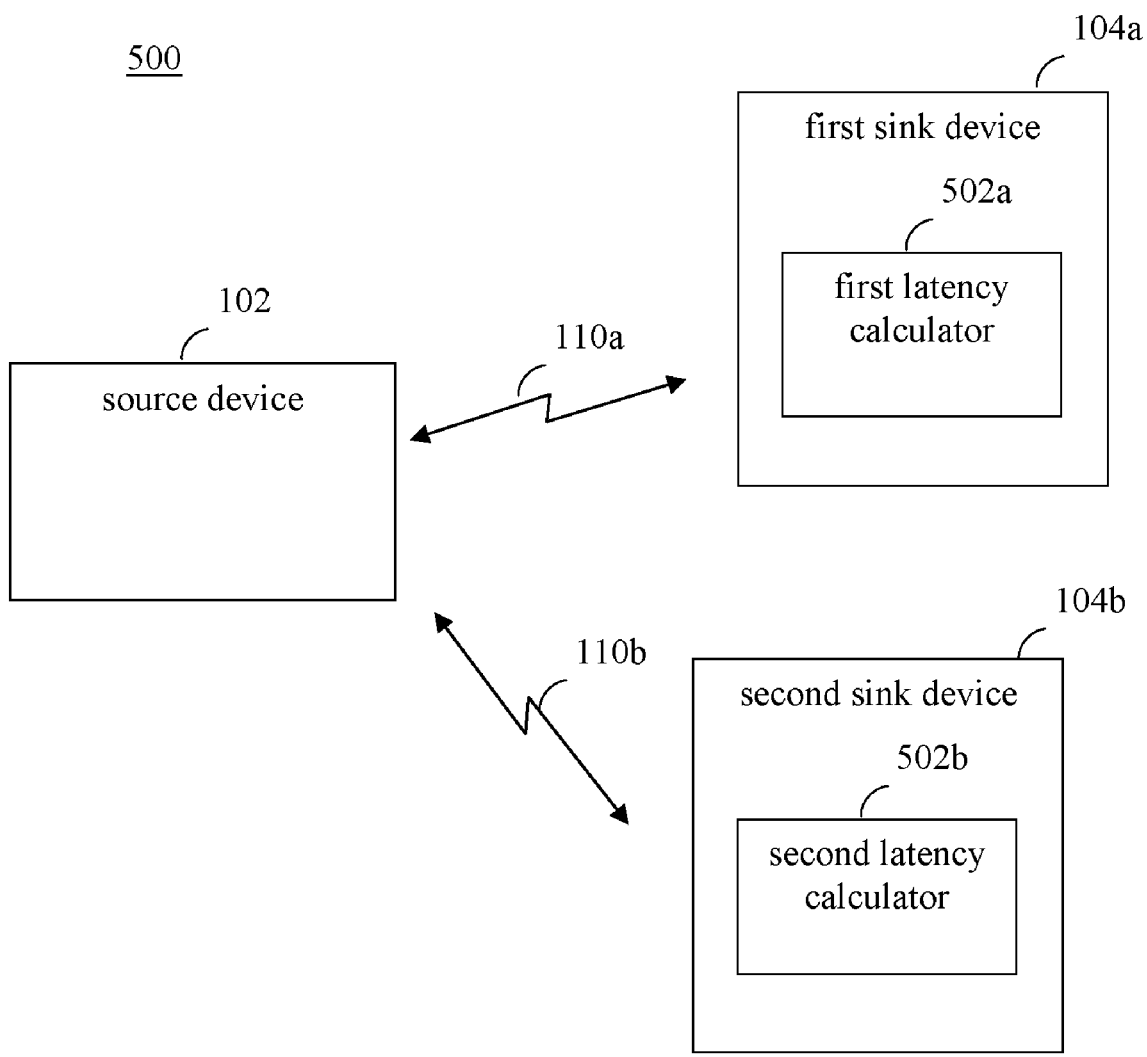
FIG. 5 shows an example BLUETOOTH wireless communication system, according to an embodiment of the present invention.

FIG. 5 shows an example BLUETOOTH wireless communication system 500, according to an embodiment of the present invention. As shown in FIG. 5, system 500 is generally similar to system 100 of FIG. 1. System 500 includes source device 102, first sink device 104a, and second sink device 104b. However, in system 500, first sink device 104a includes first latency calculator 502a and second sink device 104b includes a second latency calculator 502b. First latency calculator 502a calculates latency for data received in first communication channel 110a and output (e.g., played, displayed, etc.) by first sink device 104a. Second latency calculator 502b calculates latency for data received in second communication channel 110b and output (e.g., played, displayed, etc.) by second sink device 104b. First and second latency calculators 502a and 502b enable first and second sink devices 104a and 104b to output their respective data in sync with each other. Thus, in an audio data embodiment, the audio may be output by each of first and second sink devices 104a and 104b in sync (e.g., in stereo). In an embodiment where first sink device 104a outputs audio and second sink device 104b outputs corresponding video, the audio and video may be output in sync (e.g., voice audio is in sync with video image stream mouth movement).

Figure 6:
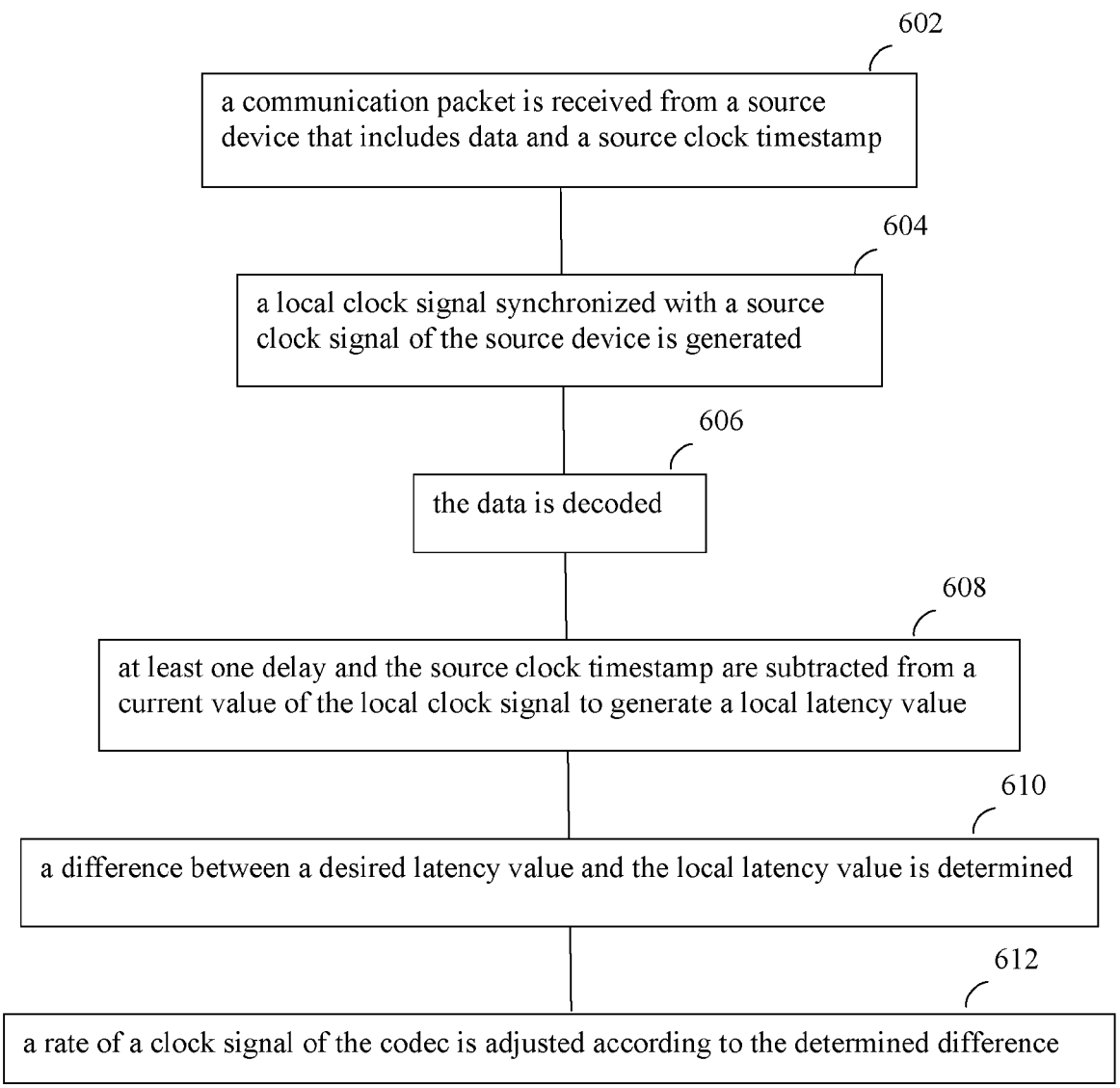
FIG. 6 shows a flowchart providing example steps for a process operating in a sink device to enable synchronized data output with other sink devices, according to example embodiments of the present invention.
Figure 7:
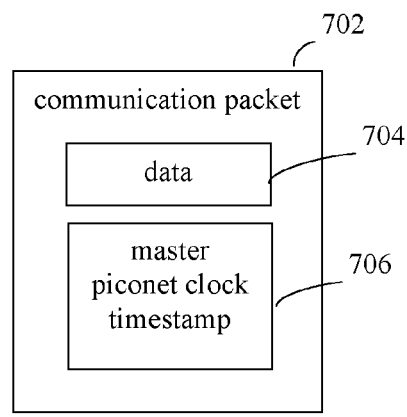
FIG. 7 shows an example communication packet that may be received by a sink device from a source device, according to an example embodiment of the present invention.
Figure 8:
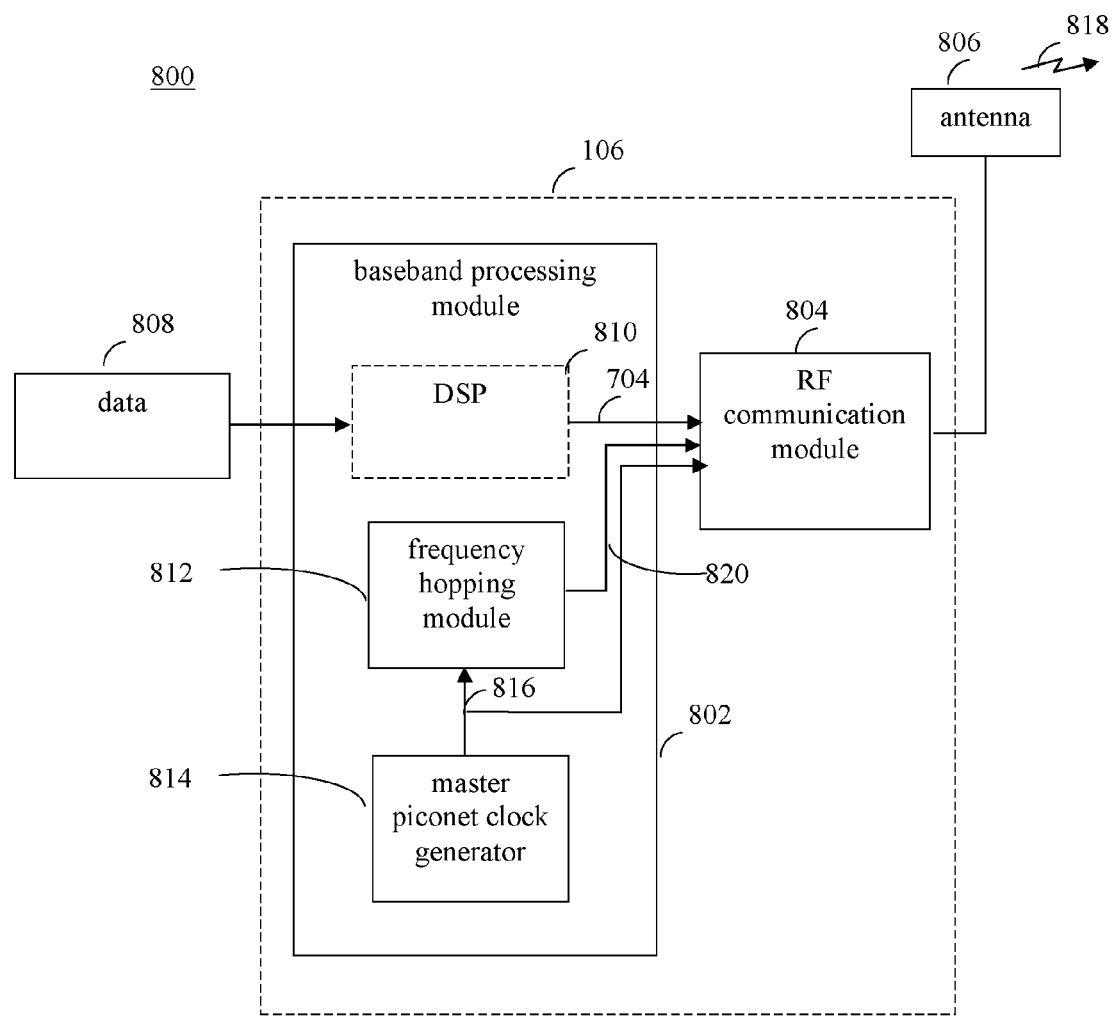
FIG. 8 shows a block diagram of an example source device, according to an embodiment of the present invention.
Figure 9:
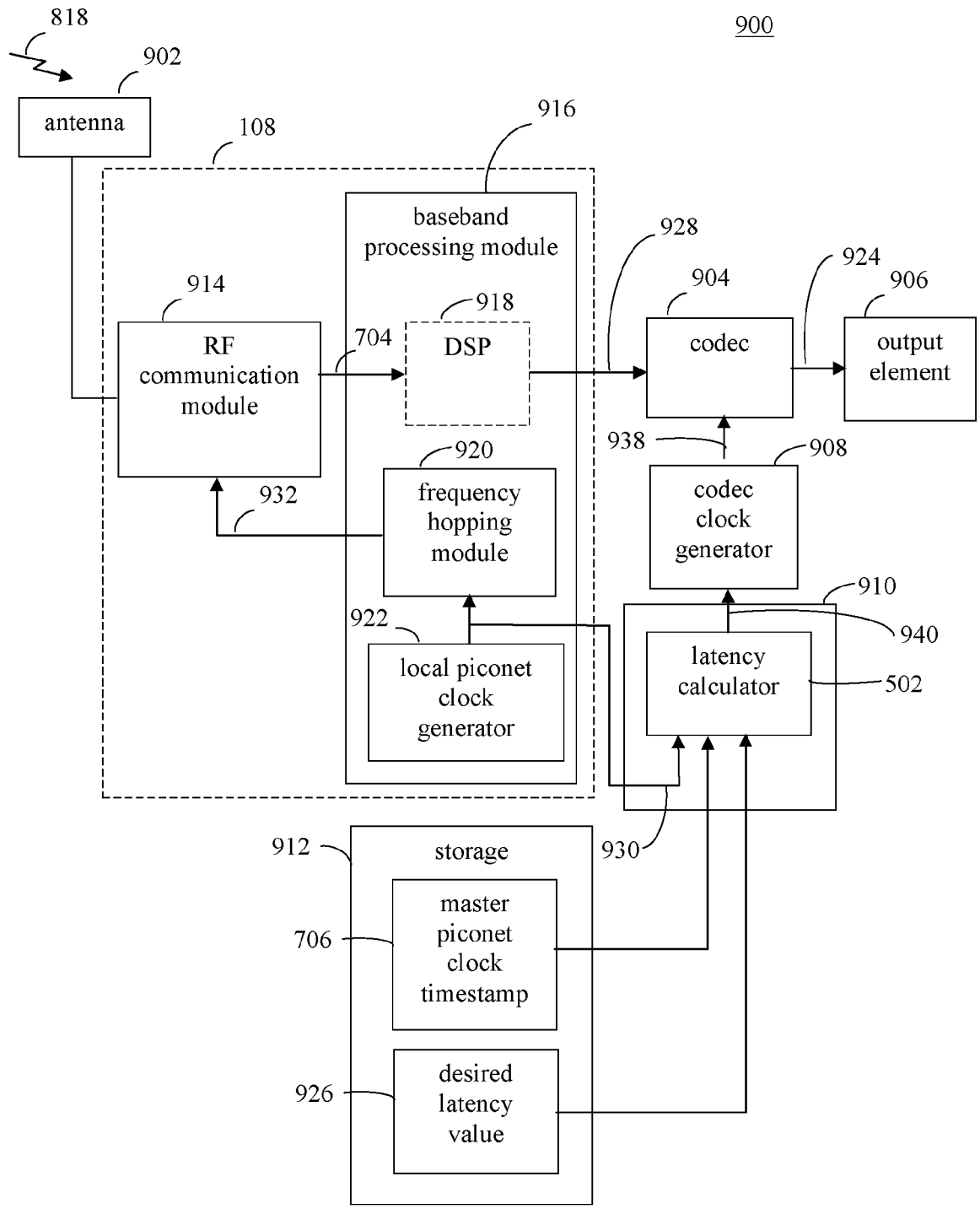
FIG. 9 shows a block diagram of an example sink device, according to an embodiment of the present invention.

FIG. 6 shows a flowchart 600 providing example steps for a process operating in each sink device to enable synchronized data output, according to example embodiments of the present invention. Other structural and operational embodiments will be apparent to persons skilled in the relevant art(s) based on the following discussion. Flowchart 600 is described below with respect to FIGS. 7-9 for illustrative purposes. FIG. 7 shows an example communication packet 702 that may be received in a communication channel 110 from a source device, according to an example embodiment of the present invention. FIG. 8 shows a block diagram of an example source device 800, and FIG. 9 shows a block diagram of an example sink device 900, according to embodiments of the present invention.

Flowchart 600 begins with step 602. In step 602, a communication packet is received from a source device that includes data and a source clock timestamp. For instance, FIG. 7 shows communication packet 702 including data 704 and a master piconet clock timestamp 706. Data 704 may be any type of data, including audio data or video data. For example, data 704 may be a portion of an audio or video data stream provided by source device 102 in a stream of communication packets similar to communication packet 702. Master piconet clock timestamp 706 is a value of a master piconet clock of source device 102 at the time that communication packet 702 is transmitted by source device 102.

FIG. 8 shows source device 800, which is an example of source device 102 of FIG. 5, and is configured to generate communication packet 702 shown in FIG. 7. Source device 800 may be a music player, mobile computer, cell phone, or other type of source device mentioned elsewhere herein or otherwise known. As shown in FIG. 8, source device 800 includes data 808, BLUETOOTH communications module 106, and an antenna 806. Data 808, which may be audio, video, and/or other data, is received by baseband communications module 106. BLUETOOTH communications module 106 packages data 808 into a packet (e.g., communication packet 702) formatted according to the BLUETOOTH protocol, and generates an RF communications signal 818 that includes the BLUETOOTH data packet. Antenna 806 transmits RF communications signal 818.

As shown in the example of FIG. 8, baseband communications module 106 includes a baseband processing module 802 and a RF communications module 804. Baseband processing module 802 runs the BLUETOOTH software stack and controls RF communication module 804. For example, baseband processing module 802 may include a microcontroller to run the BLUETOOTH software stack. Furthermore, in the example of FIG. 8, baseband processing module 802 includes a digital signal processor (DSP) 810, a frequency hopping module 812, and a master piconet clock generator 814. DSP 810 is optionally present. When present, DSP 810 may be used to process data 808. For example, DSP 810 may be used to convert a stream of data from one form to another form of data that is output to RF communication module 804 as data 704. For example, data 808 may include MP3 formatted audio data. DSP 810 may be used to convert the MP3 audio data to SBC (sub band coding) data (e.g., decoding the MP3 data, and encoding the resulting data into SBC format), which is output to RF communication module 804. Alternatively, DSP 810 is not present, and data 808 may be left unaltered when provided to RF communication module 804.

Master piconet clock generator 814 generates a BLUETOOTH master clock signal 816. Frequency hopping module 812 receives master clock signal 816. Frequency hopping module 812 determines a pseudo-random hopping sequence of RF channels for RF communication module 804. The hopping sequence is unique for piconet 200 and is determined by the device address of source device (master device). The phase in the hopping sequence is determined by master clock signal 816. An indication of the determined pseudo-random hopping sequence is output by frequency hopping module 812 on frequency hopping sequence indicator signal 820.

RF communication module 804 receives data 704, master clock signal 816, and frequency hopping sequence indicator signal 820. RF communication module 804 includes a transmitter, and may include a receiver. The transmitter and receiver may be configured as a transceiver if both are present. RF communication module 804 is configured to modulate data onto an RF carrier signal having a frequency determined by frequency hopping sequence indicator signal 820. The RF carrier signal is generally near 2.45 GHz for BLUETOOTH communication signals. RF communication module 804 may generate communication packet 702 by modulating data 704 and master piconet clock timestamp 706 on a carrier signal. Master piconet clock timestamp 706 is a selected value of master clock signal 816 prior to transmitting communication packet 702 from source device 800. Communication packet 702 is transmitted by antenna 806 in communication signal 818.

Referring back to flowchart 600 in FIG. 6, in step 604, a local clock signal synchronized with a source clock signal of the source device is generated. FIG. 9 shows sink device 900, which is an example of a sink device 104 shown in FIG. 1, and which is configured to receive communication signal 818 according to step 602 of flowchart 600. Furthermore, sink device 900 is configured to synchronize a local clock signal with master clock signal 816 of source device 800 of FIG. 8.

As shown in FIG. 9, sink device 900 includes BLUETOOTH communication module 108, an antenna 902, a codec 904, an output element 906, a codec clock generator 908, a processing module 910, and a storage 912. BLUETOOTH communication module 108 receives communication signal 818 from antenna 902, which includes communication packet 702. BLUETOOTH communication module 108 extracts communication packet 702 from communication signal 818. BLUETOOTH communication module 108 outputs a data signal 928 and a slave clock signal 930. Slave clock signal 930 is a local BLUETOOTH piconet clock signal for BLUETOOTH communication module 108.

As shown in FIG. 9, in an embodiment, BLUETOOTH communication module 108 includes a RF communication module 914 and a baseband processing module 916. Baseband processing module 916 runs the BLUETOOTH software stack and controls RF communication module 914. RF communication module 914 includes a receiver, and may include a transmitter. The transmitter and receiver may be configured as a transceiver if both are present. RF communication module 914 is configured to down-convert and demodulate data received on RF communication signal 818. A frequency of RF communication signal 818 is determined by a frequency hopping sequence indicator signal 932.

RF communication module 914 recovers communication packet 702, which includes data 704 and master piconet clock timestamp 706. Master piconet clock timestamp 706 is stored in storage 912. As shown in the example of FIG. 9, baseband processing module 916 includes a DSP 918, a frequency hopping module 920, and local piconet clock generator 922. Local piconet clock generator 922 generates slave clock signal 930. Local piconet clock generator 922 is synchronized with master piconet clock generator 814 of source device 800 by a synchronization packet previously transmitted by source device 800 to sink device 900, as described above with reference to synchronization packet 210 shown in FIG. 4. Slave clock signal 930 is received by frequency hopping module 920. Frequency hopping module 920 determines a pseudo-random hopping sequence of RF channels for RF communication module 914, in a synchronized fashion with frequency hopping module 812 of source device 800.

Data 704 is output by RF communication module 914, and is received by baseband processing module 916. DSP 918 is optionally present in baseband processing module 916. When present, DSP 918 may be used to process data 704. For example, DSP 918 may be used to convert a stream of data from one form to another form of data that is output to codec 904 in data signal 928. For example, data 704 may include MP3 audio data. DSP 918 may be used to convert the MP3 audio data to SBC data, which is output on data signal 928. Alternatively, DSP 918 is not present, and data 704 may be left unaltered when output on data signal 928.

Referring back to flowchart 600 of FIG. 6, in step 606, the data is decoded. For example, as shown in FIG. 9, codec 904 may perform decoding. In FIG. 9, codec 904 receives data signal 928, and generates an output signal 924. Codec 904 performs bit stream decoding of data on data signal 928 to generate output signal 924. Furthermore, depending on the implementation of output element 906, which receives output signal 924, codec 904 may perform a digital-to-analog conversion (e.g., may include a digital-to-analog converter (DAC)), to convert the decoded data to analog form. For example, in an embodiment, output element 906 is a speaker that receives output signal 924 as an analog audio signal. In another embodiment, output element 906 is a display device, such as a high-definition display device that receives output signal 924 as a digital data stream. For example, output element 906 may have a digital interface, such as an HDMI (high-definition multimedia interface) interface configured for digital audio/video data. Thus, in embodiments, output signal 924 may be a digital or analog signal, depending on the particular implementation of output element 906.

In step 608, at least one delay and the source clock timestamp are subtracted from a current value of the local clock signal to generate a local latency value. For example, as shown in FIG. 9, sink device 900 may include processing module 910, which may be configured to provide any type of processing for sink device 900. Processing module 910 may include hardware, software, firmware, or any combination thereof to perform its functions. For example, processing module 920 may include digital logic, a processor, a microcontroller, a DSP, and/or other processing elements. In FIG. 9, processing module 910 includes latency calculator 502. In an embodiment, latency calculator 502 is configured to perform step 608. As shown in FIG. 9, latency calculator 502 receives master piconet clock timestamp 706 and receives slave clock signal 930. Furthermore, latency calculator 502 may store and/or receive an indication of one or more delays for data passing through sink device 900 to output element 906. For example, latency calculator 502 may store or receive an indication of a delay of data received on data signal 928 passing through codec 904 (e.g., a FIFO delay). In another example, latency calculator 502 may store or receive an indication of a delay of data passing through baseband processing module 916 (e.g., a buffer delay, a delay of DSP 918, etc.).

Thus, in an embodiment, latency calculator 502 may perform the following equation to generate a local latency value, Latency$_{Local}$:

$$\text{Latency}_{Local} = LC - \left( \sum_{i=0}^{N} \text{Delay}(i) + SCTS \right) \quad \text{Equation 1}$$

where:
LC=slave clock signal 930;
Delay(i)=one or more (N) data delays in sink device 900; and
SCTS=master piconet clock timestamp 706.

Latency calculator 502 may include hardware, software, firmware, or any combination thereof to perform its functions. For example, the above equation may be implemented in latency calculator 502 in digital logic, in software or firmware that runs in a processor, or otherwise. Note that in alternative embodiments, a local latency for data passing through sink device 900 can be calculated in other ways, as would be known to persons skilled in the relevant art(s).

In step 610, a difference between a desired latency value and the local latency value is determined. For example, as shown in FIG. 9, storage 912 stores a desired latency value 926, which is received by latency calculator 502. Desired latency value 926 is a desired latency value (e.g., a time delay) for data output at output element 906. For example, desired latency value 926 may be a desired time period for output element 906 to receive output signal 924 after data 704 is received by sink device 900 (e.g., after being recovered by RF communication module 914 from communication signal 818). Thus, if the latency difference (determined in step 610) from the desired latency value 926 value is 50 μsec, it is desired that output signal 924 be received by output element 906 (e.g., to be played as audio, displayed as video, etc.) 50 μsec after the corresponding data is received at sink device 900. One or more sink devices in addition to sink device 900 may store the same value for desired latency value 926. Thus, the sink device(s) in addition to sink device 900 may also generate their respective output signals synchronized with sink device 900, keeping all of the respective audio, video, and/or other output signal types in sync. In this manner, coordinated sound, video images, and/or other output signals may be generated by a plurality of sink devices. Furthermore, the sink devices do not need to directly communicate with each other. In an embodiment, desired latency value 926 is pre-stored in sink device 900 (e.g., stored during manufacture/test of sink device 900). In another embodiment, desired latency value 926 is transmitted to sink device 900 from source device 800 (e.g., transmitted in a conventional or proprietary instruction/message) and stored in storage 912.

Thus, in an embodiment, latency calculator 502 may perform the following equation to determine the difference, $Latency_{Diff}$, between a desired latency value and the local latency value:

$$Latency_{Diff} = Latency_{Desired} - Latency_{Local} \qquad \text{Equation 2}$$

where:

$Latency_{Desired}$=desired latency value 926.

For example, the above equation may be implemented in latency calculator 502 in a variety of ways, including in digital logic, in software or firmware that runs in a processor, or otherwise.

In an embodiment, step 608 may be repeated multiple times for additional communication packets to generate multiple local latency values, which may be averaged, and the average local latency value may be compared to the desired latency value in step 610. This averaging process may be repeated, such that a moving local latency value average is generated. Using average values for local latency to adjust the rate of codec clock signal 938 may compensate for system jitter, leading to greater stability in codec clock signal 938 and smoother output audio signals.

In step 612, a rate of a clock signal of the codec is adjusted according to the determined difference. For example, as shown in FIG. 9, codec clock generator 908 generates a codec clock signal 938 that is received by codec 904. Codec clock signal 938 is used as a clock for codec 904, to clock, and thereby control a rate of one or more processes performed by codec 904, such as decoding data and/or converting digital data to analog (when needed). Codec clock generator 908 receives a codec clock rate adjustment signal 940 from latency calculator 502. Codec clock rate adjustment signal 940 is configured to cause codec clock generator 908 to adjust a clock rate of codec clock signal 938 according to $Latency_{Diff}$. For example, in an embodiment, codec clock generator 908 may include a variable phase lock loop (PLL). Codec clock rate adjustment signal 940 may be received as an input reference signal by the variable PLL to speed up or slow down the oscillation rate of the PLL to vary the rate of codec clock signal 938. In other embodiments, codec clock rate adjustment signal 940 may cause codec clock generator 908 to vary a rate of codec clock signal 938 in alternative ways.

Codec clock rate adjustment signal 940 may be configured in a variety of ways. In one embodiment, codec clock rate adjustment signal 940 is a signal causing an adjustment in codec clock signal 938 proportional to the value of $Latency_{Diff}$. Alternatively, codec clock rate adjustment signal 940 provides one of a set of predetermined values that are selected based on the value of $Latency_{Diff}$. For example, the set may include three values that respectively cause a predetermined increase, a predetermined decrease, and no change in a rate of codec clock signal 938. For example, in an embodiment, codec clock rate adjustment signal 940 may have a zero value if no adjustment of codec clock signal 938 is needed. Furthermore, codec clock rate adjustment signal 940 may have a positive value if a rate of codec clock signal 938 is to be increased and may have a negative value if the rate of codec clock signal 938 is to be decreased. Alternatively, codec clock rate adjustment signal 940 may have a negative value if a rate of codec clock signal 938 is to be increased and may have a positive value if the rate of codec clock signal 938 is to be decreased. In further embodiments, codec clock rate adjustment signal 940 may have alternative values when no adjustment of codec clock signal 938 is needed, and to cause increases or decreases to a rate of codec clock signal 938.

In systems, any number of sink devices 900 may be used with source device 800 to output data in a parallel, synchronized fashion. By having a defined latency, synchronized outputs are created. Furthermore, synchronization can be obtained without direct communication between the sink devices. Still further, in BLUETOOTH embodiments, the existing piconet clocks of the master device and the slave (sink) device(s) can be used as the above described synchronized source and local clock signals, simplifying the overall system configuration.

A variety of types of source and sink devices may be configured to perform flowchart 600, and may include functionality similar to that shown in FIGS. 8 and 9. Several example types of source and sink devices are described below.

Figure 10:
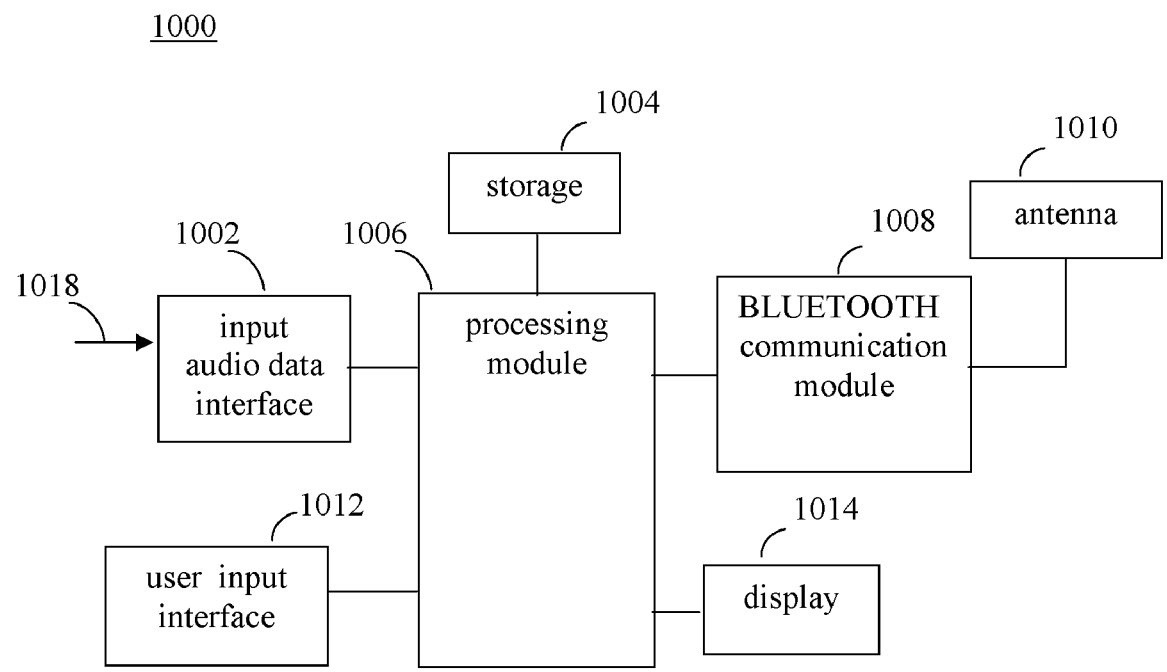
FIG. 10 shows a block diagram of an example music player, according to an embodiment of the present invention.
Figure 11:
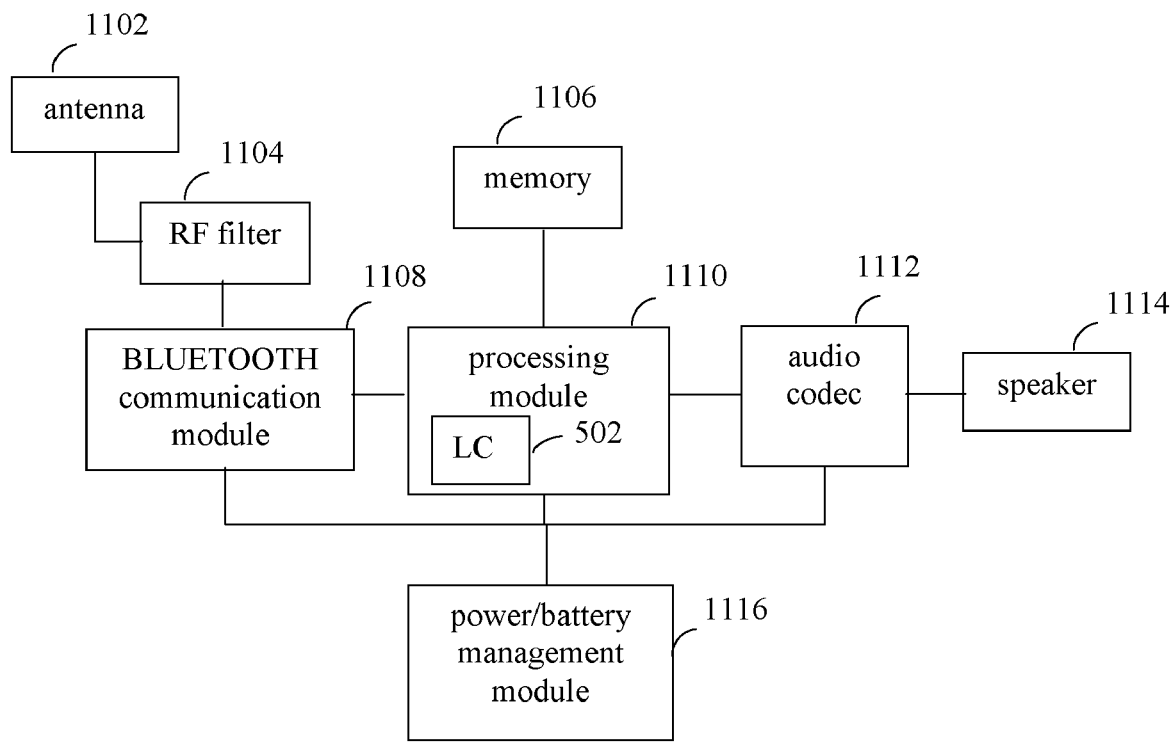
FIG. 11 shows a block diagram of an example earphone device, according to an embodiment of the present invention.

For example, FIG. 10 shows a block diagram of a music player 1000, which is an example of a source device, and FIG. 11 shows a block diagram of an earphone device 1100, which is an example of a sink device, according to example embodiments of the present invention. A pair of earphone devices 1100 may be used with music player 1000 in a music player system. For example, a first earphone device 1100 may receive right channel audio data from music player 1000 and a second earphone device 1100 may receive left channel audio data from music player 1000. Music player 1000 may be an immobile music player, such an AM and/or FM radio console, a satellite radio device, a tuner, or a receiver, or a mobile music player, such as an IPOD or MP3 music player. Earphone device 1100 is worn on the head of a user, adjacent or attached to the user's ear. Using a pair of earphone devices 1100 with a latency calculator embodiment enables synchronized, stereo audio, without wires and without audible distortion. The pair of earphone devices 1100 may be unconnected, or may be configured together in a headset.

As shown in FIG. 10, music player 1000 includes an input audio data interface 1002, storage 1004, a processing module 1006, a BLUETOOTH communication module 1008, an antenna 1010, a user input interface 1012, and a display 1014. These components may be contained in a housing, such as a stationary (e.g., shelf mounted) or a handheld housing. In an embodiment, components of music player 1000 may include the functionality/structure of similarly named components of source device 800 shown in FIG. 8. For example, BLUETOOTH communication module 1008 may include baseband processing module 802 and RF communication module 804 shown in FIG. 8.

Music player 1000 stores audio files, plays music, and enables a user to hear a song being played. Music files (e.g., MP3, AAC/M4A, Protected AAC, AIFF, WAV, Audible audiobook, APPLE Lossless audio file format, etc.) may be received on audio file input signal 1018 at input audio data interface 1002. Input audio data interface 1002 may include a conventional interface, such as USB (universal serial bus), FIREWIRE, Ethernet, parallel port, or other interface type for receiving audio file input signal 1018. The audio files are stored in storage 1004, which may be any suitable type of storage device, such as a memory (e.g., FLASH memory) or hard drive.

User input interface 1012 enables a user of music player 1000 to interact with music player 1000 to play audio files, manage storage of audio files, and to change volume, tone, treble, bass, etc. User input interface 1012 may include one or more buttons, a keyboard, a voice activated input system, a wheel such as a click wheel, etc. Display 1014 displays information regarding music player 1000, such as information regarding stored audio files, information regarding an audio file currently being played, etc. Display 1014 may include any type of display mechanism, including one or more LEDs (light emitting diodes), an LCD (liquid crystal display) panel, etc.

Processing module 1006 is coupled to each of input audio data interface 1002, storage 1004, BLUETOOTH communication module 1008, user input interface 1012, and display 1014. Processing module 1006 may be individually connected to these components, or one or more of these components may be connected to processing module 1006 in a common bus structure. Processing module 1006 monitors user input at user input interface 1012, reads audio files from storage 1004, causes corresponding display at 1014, and causes audio files to be supplied to BLUETOOTH communication module 1008 to be transmitted to a sink device via antenna 1010. BLUETOOTH communication module 1008 may stream the audio data to a sink device in a communication channel according to a BLUETOOTH Advanced Audio Distribution Profile (A2DP) format, in an embodiment.

In an embodiment, processing module 1006 includes a digital signal processor (DSP). When present, the DSP may apply special effects to an audio file (e.g., an equalization function), and streams the data to BLUETOOTH communication module 1008. The DSP may run a decompression algorithm that unencodes encoded audio files.

In an embodiment, music player 1000 is directly connected to an external AC or DC power source. Alternatively, music player 1000 is battery powered and may include a battery port.

As shown in FIG. 11, earphone device 1100 includes an antenna 1102, a RF filter 1104, a memory 1106, a BLUETOOTH communication module 1108, a processing module 1110, an audio codec 1112, a speaker 1114, and a power/battery management module 1116. These components may be contained in a housing, such as a headset, an earbud, a canalphone, etc. In an embodiment, components of earphone device 1100 may include the functionality/structure of similarly named components of sink device 900 shown in FIG. 9. For example, BLUETOOTH communication module 1108 may include baseband processing module 916 and RF communication module 914 shown in FIG. 9. Furthermore, processing module 1110 may include latency calculator 502. In the example of FIG. 11, output element 906 is speaker 1114. Components of earphone device 1100 may be interconnected as shown in FIG. 11, or in other ways, such as by a common bus structure. Earphone device 1100 receives audio data from a music player, such as music player 1000 shown in FIG. 10, converts the audio data to sound, broadcasting the resulting sound from speaker 1114.

Antenna 1102 receives a transmitted RF BLUETOOTH communication signal that includes audio data. RF filter 1104 is optionally present to filter the received RF BLUETOOTH communication signal. BLUETOOTH communication module 1108 recovers audio data from the RF signal, and outputs the audio data to processing module 1110. Processing module 1110 may buffer audio data in memory 1106. Memory 1106 may include any suitable type of storage, including a FLASH memory device. Latency calculator 502 of processing module 1110 compares present output latency against a desired output latency for earphone device 1100, and adjusts a rate of data output by audio codec 1112 accordingly. Audio codec 1112 performs bit stream decoding of the audio data (if needed) and converts the decoded data to an analog signal. In an embodiment, audio codec 1112 is included in an audio codec device. Speaker 1114 receives the analog signal, and outputs corresponding sound (e.g., music and/or voice). Power/battery management module 1116 converts input battery power to run various components of earphone device 1100.

Figure 12:
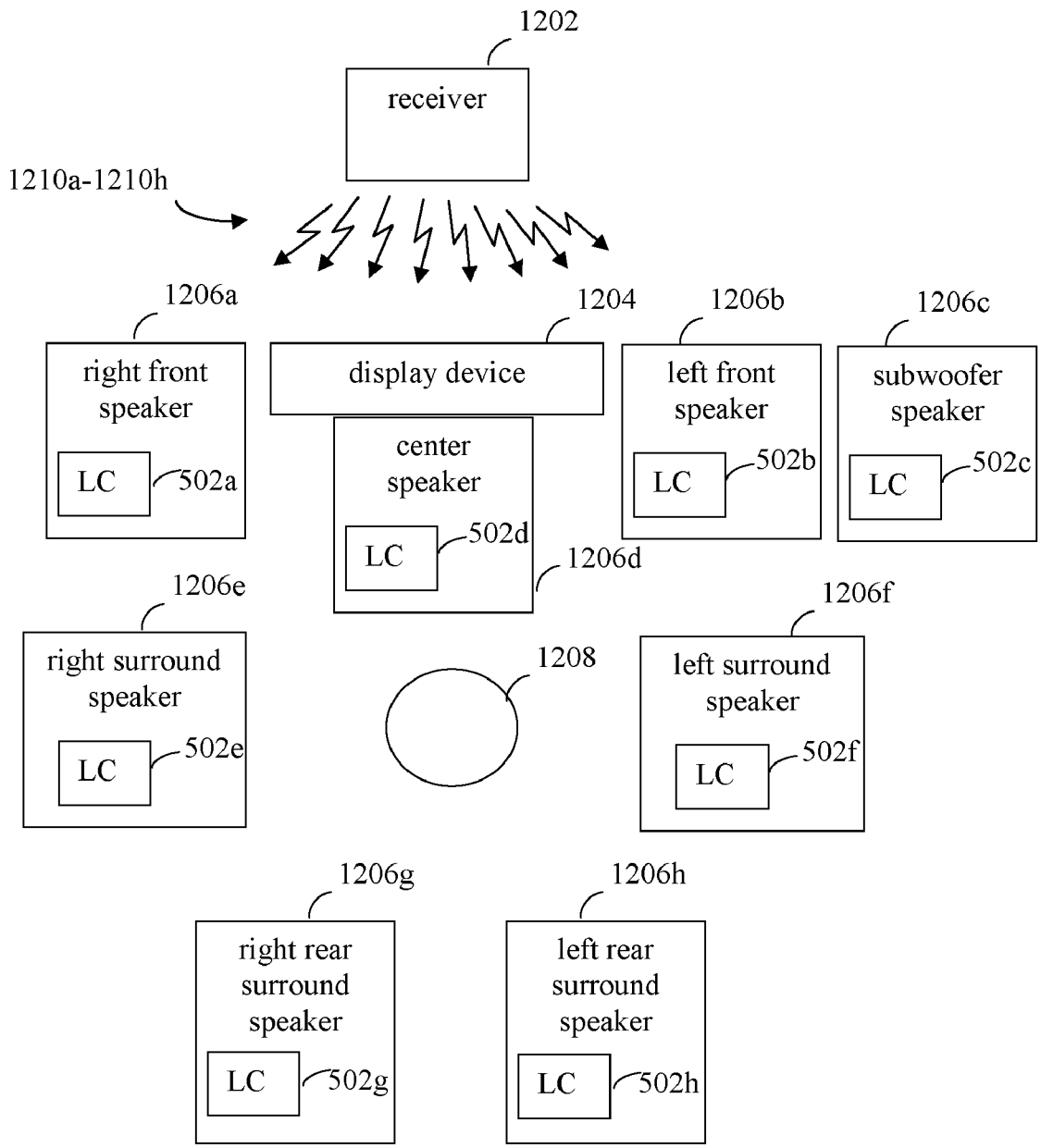
FIG. 12 shows an example audio/video system, according to an embodiment of the present invention.

Other types of audio systems other than a music player/earphone type system are applicable to embodiments of the present invention. For example, FIG. 12 shows an example audio/video system 1200, according to an embodiment of the present invention. System 1200 may be a home theater system, a commercial theater system, or other type of audio/video system. As shown in FIG. 12, audio/video system 1200 includes a receiver 1202, a display device 1204, a right front speaker 1206a, a left front speaker 1206b, a subwoofer speaker 1206c, a center speaker 1206d, a right surround speaker 1206e, a left surround speaker 1206f, a right rear surround speaker 1206g, and a left rear surround speaker 1206h. A user 1208 is positioned in front of display device 1204 and between speakers 1206a-1206h to receive output video and sound from system 1200. In the example of FIG. 12, system 1200 may be considered a 7.1 channel audio system, as left and right surround speakers 1206e and 1206f, as well as right and left rear surround speakers 1206g and 1206h are present. Alternatively, right and left rear surround speakers 1206g and 1206h may not be present to form a 5.1 channel audio system, or only a single rear surround speaker may be present to form a 6.1 channel audio system.

Receiver 1202 communicates with each of speakers 1206a-1206h with a respective communication signal 1210a-1210h to provide corresponding audio data. For example, communication signals 1210a-1210h may be BLUETOOTH communication signals, or communications signals according to another protocol. Receiver 1202 and speakers 1206a-1206h may each have a corresponding BLUETOOTH communication module. Furthermore, as shown in FIG. 12, each of speakers 1206a-1206h has a respective one of latency calculators 502a-502h. Each latency calculator 502a-502h compares a present output latency for a respective one of speakers 1206a-1206h against a desired output latency, and adjusts a rate of sound output accordingly, to synchronize audio of speakers 1206a-1206h.

Note that in an embodiment, display device 1204 may include a latency calculator to synchronize video output from display device 1204 with sound output by speakers 1206a-1206h.

Figure 13:
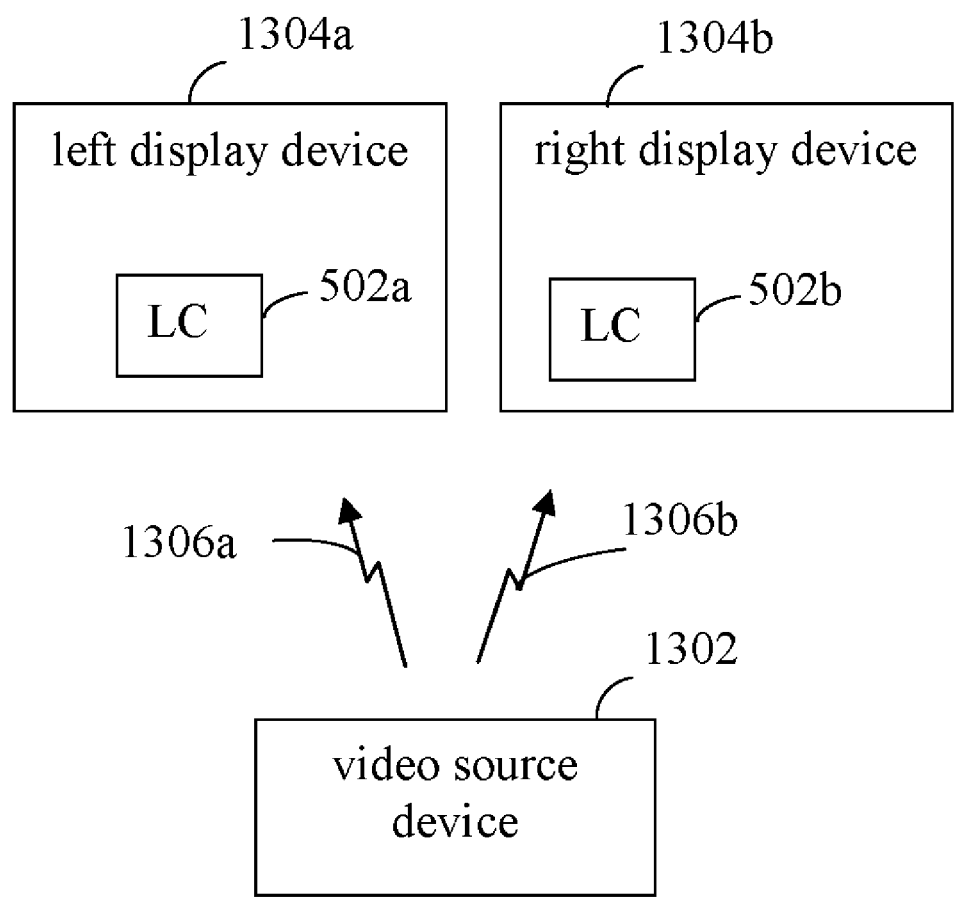
FIG. 13 shows an example multi-display video system, according to an embodiment of the present invention.

FIG. 13 shows an example multi-display video system 1300, according to an embodiment of the present invention. As shown in FIG. 13, system 1300 includes a video source device 1302, a left display device 1304a, and a right display device 1304b. Display devices 1304a and 1304b may display the same image or may display portions (e.g., each display half) of a single image. Display devices 1304a and 1304b may be any type of display devices, including flat screen televisions (e.g., plasma, LCD, or rear projection), projector televisions, CRT monitors, left and right displays in a head mounted display device, etc.

Video source device 1302 communicates with each of display devices 1304a and 1304b using a respective one of communication signals 1306a and 1306b to provide corresponding video data, such as MPEG formatted data. For example, communication signals 1306a and 1306b may be BLUETOOTH communication signals, or communications signals according to another protocol. Video source device 1302 and display devices 1304a and 1304b may each have a corresponding BLUETOOTH communication module. The BLUETOOTH communication module of video source device 1302 may stream the video data to right and left display devices 1304a and 1304b according to a BLUETOOTH Video Distribution Profile (VDP) format, in an embodiment.

Furthermore, as shown in FIG. 13, each of display devices 1304a and 1304b has a respective one of latency calculators 502a and 502b. Each latency calculator 502a and 502b compares present output latency for a respective one of display devices 1304a and 1304b against a desired output latency, and adjusts a rate of video output accordingly, to synchronize video streams of display devices 1304a and 1304b.

Further audio data and video data embodiments, and embodiments for other data types, are also intended to be within the scope and spirit of the present invention, as would be known to persons skilled in the relevant art(s).

Example Relay Synchronization Embodiments

Example embodiments are described in this section for communication systems that include relay devices. A relay device receives a first communication signal that includes content (e.g., audio and/or video) from a source device. In an embodiment, the relay device transmits one or more communication signals that include the received content to a plurality of sink devices, which output the content in a synchronized manner. In another embodiment, the relay device transmits one or more communication signals that include the content to one or more sink devices. The relay device outputs the content in a synchronized manner with the sink devices.

The example embodiments described herein are provided for illustrative purposes, and are not limiting. Example embodiments are described below with respect to the BLUETOOTH protocol. However, embodiments may use communications protocols other than BLUETOOTH, including industry standard protocols and proprietary protocols, as would be known to persons skilled in the relevant art(s) from the teachings herein. Furthermore, additional structural and operational embodiments, including modifications/alterations, will become apparent to persons skilled in the relevant art(s) from the teachings herein.

Figure 14:
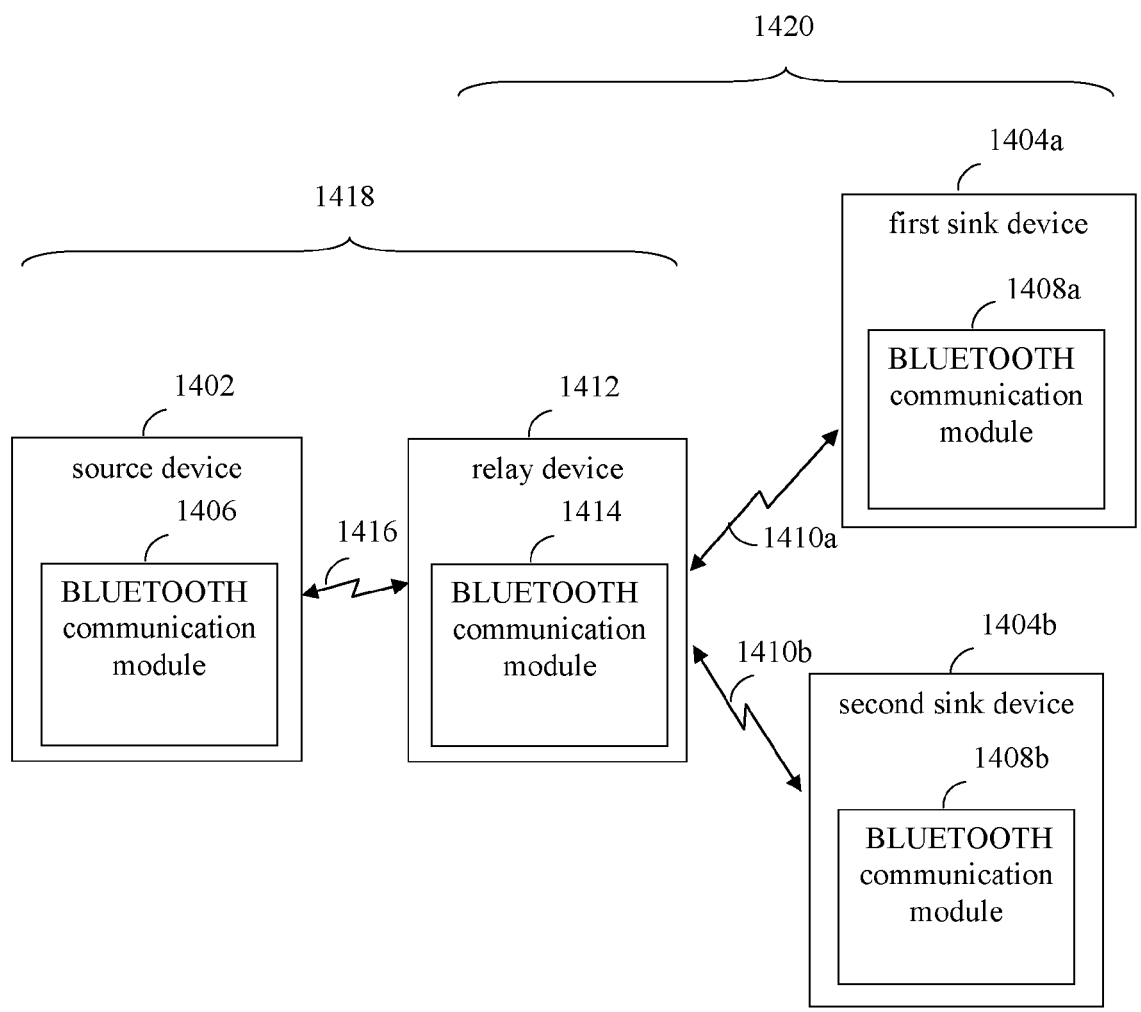
FIGS. 14-17 show block diagrams of example BLUETOOTH wireless communication systems, according to embodiments of the present invention.

FIG. 14 shows an example BLUETOOTH wireless communication system 1400, according to an embodiment of the present invention. As shown in FIG. 14, system 1400 includes a source device 1402, a relay device 1412, a first sink device 1404a, and a second sink device 1404b. Similarly to source device 102 described above (e.g., with respect to FIG. 1), source device 1402 may be any type of device, mobile or immobile, that is configured to provide a stream of data to one or more sink devices. For example, source device 1402 may be an audio source device such as a music player (e.g., an MP3 player, an APPLE IPOD, etc.) or mobile phone (e.g., a cell phone), a video source device (e.g., a cable box that supplies digital video, an analog video signal receiver or tuner, etc.) a mixed media source device (e.g., a stereo receiver that sources video and audio), or a device (e.g., a computer system) that sources other types of data streams. Sink devices 1402 may be any type of device that receives and processes a received data stream, such as a wireless speaker (e.g., an earphone, earbud, or headset speaker, a home audio speaker, etc.), a wireless display device (e.g., a wireless flat screen television, including a high-definition television), or other device.

Relay device 1412 is a device, mobile or immobile, that is configured to receive a first data stream from a source device, such as source device 1402, and to provide a second data stream to one or more sink devices 1404, such as a pair of sink devices 1404a and 1404b.

As shown in FIG. 14, source device 1402 includes a BLUETOOTH communication module 1406, relay device 1412 includes a BLUETOOTH communication module 1414, first sink device 1404a includes a BLUETOOTH communication module 1408a, and second sink device 1404b includes a BLUETOOTH communication module 1408b. BLUETOOTH communication module 1406 enables source device 1402 to communicate with relay device 1412 according to a BLUETOOTH communication protocol. BLUETOOTH communication module 1406 communicates with BLUETOOTH communication module 1414 of relay device 1412 over a first communication channel 1416. BLUETOOTH communication module 1414 enables relay device 1412 to communicate with first and second sink devices 1404a and 1404b according to the BLUETOOTH communication protocol. BLUETOOTH communication module 1414 communicates with BLUETOOTH communication module 1408a of first sink device 1404a over a second communication channel 1410a. BLUETOOTH communication module 1414 communicates with BLUETOOTH communication module 1408b of second sink device 1404b over a third communication channel 1410b.

For example, in an embodiment where a stream of audio data is being provided through relay 1412, BLUETOOTH communication module 1406 of source device 1402 may stream the audio data to BLUETOOTH communication module 1414 of relay device 1412 through communication channel 1416 according to the BLUETOOTH Advanced Audio Distribution Profile (A2DP) format. In turn, BLUETOOTH communication module 1414 of relay device 1412 may stream the audio data to BLUETOOTH communication modules 1408a and 1408b of sink devices 1404a and 1404b through communication channels 1410a and 1410b in the A2DP format. Thus, in an embodiment, relay device 1412 may be an A2DP sink device with respect to source device 1402, and may be an A2DP source device with respect to sink devices 1404a and 1404b.

First communication channel 1416 may include RF communication signals transmitted in a unicast (point-to-point; uni- or bi-directional) channel manner or broadcast (unidirectional) channel manner between source device 1402 and relay device 1412. Second and third communication channels 1410a and 1410b may each include RF communication signals transmitted in a unicast (point-to-point; uni- or bi-directional) channel manner between relay device 1412 and a respective, designated one of first and second sink devices 1404a and 1404b. Alternatively, first and second communication channels 1410a and 1410b may be broadcast (unidirectional) channels between relay device 1412 and first and second sink devices 1404a and 1404b.

As shown in FIG. 14, BLUETOOTH communication module 1406 may communicate with BLUETOOTH communication module 1414 to form a first BLUETOOTH piconet 1418 that includes source device 1402 and relay device 1412. In the example of FIG. 14, source device 1402 is a "master" device of piconet 1418, and relay device 1412 is a "slave" device of piconet 1418. Further devices may be included in piconet 1418.

Furthermore, BLUETOOTH communication module 1414 may communicate with BLUETOOTH communication modules 1408a and 1408b to form a second BLUETOOTH piconet 1420 that includes relay device 1412, first sink device 1404a, and second sink device 1404b. In the example of FIG. 14, relay device 1412 is a "master" device of piconet 1420, and first and second sink devices 1404a and 1404b are "slave" devices of piconet 1420. Although a pair of slave devices 1404a and 1404b are shown in FIG. 2 for illustrative purposes, additional slave devices 1404 may be present in piconet 1420. Source device 1402 may include a master piconet clock for piconet 1418, and relay device 1412 may include a master piconet clock for piconet 1420. Relay device 1412 may include a slave piconet clock for piconet 1418, and first and second sink devices 1404a and 1404b may include slave piconet clocks for piconet 1420. The clocks of piconet 1418 have a common frequency according to the BLUETOOTH specification (e.g., a 625 μsec period), and the clocks of piconet 1420 likewise have a common frequency.

Figure 15:
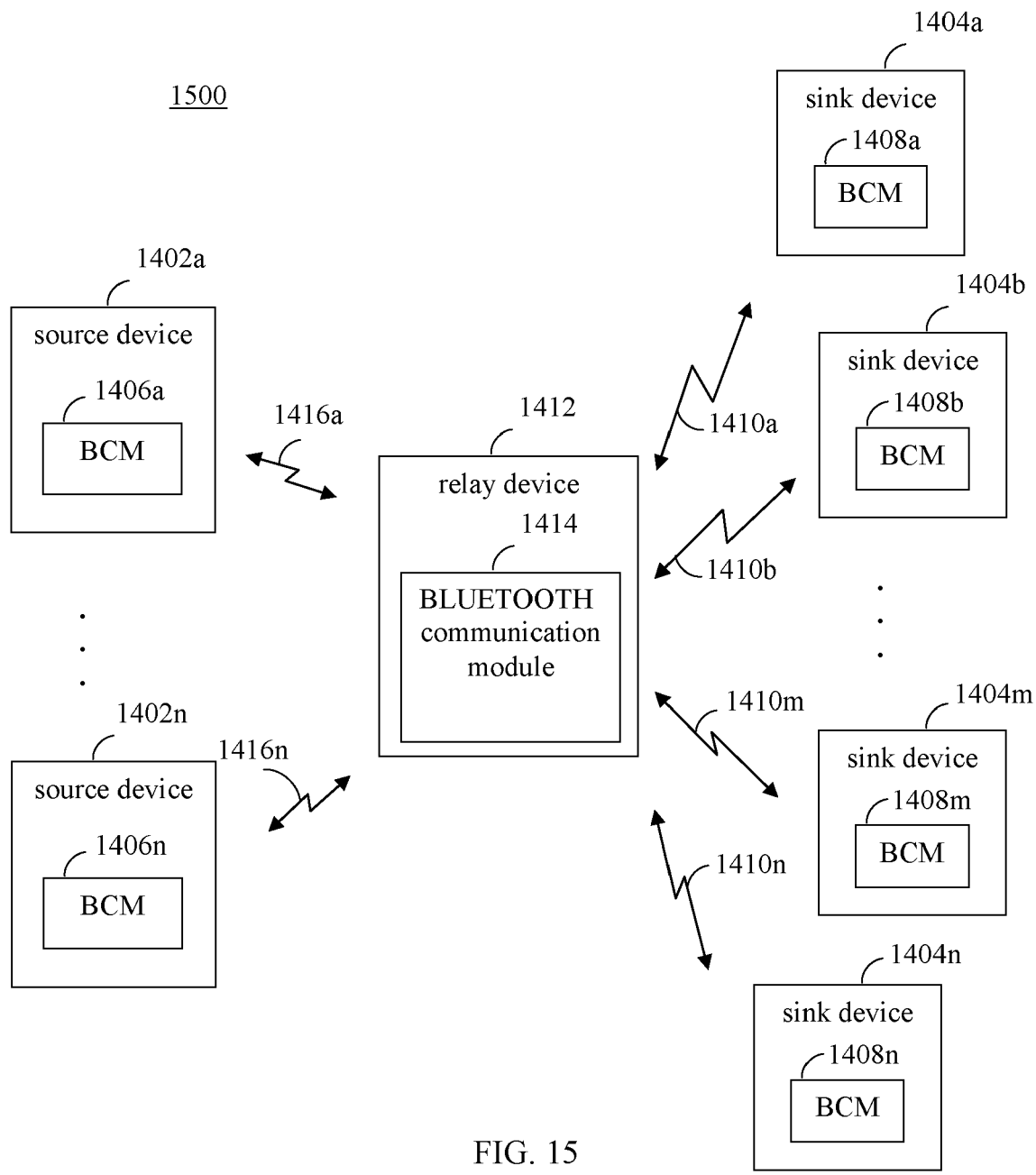

Although FIG. 14 shows a single source device 1402, additional source devices may be present in embodiments. Furthermore, additional sink devices 1404 may be present. For example, FIG. 15 shows an example BLUETOOTH wireless communication system 1500, according to embodiments of the present invention. As shown in FIG. 15, system 1500 includes a plurality of source devices 1402a-1402n, relay device 1412, and a plurality of sink devices 1404a-1404n. Any number of source devices 1402 may be present, and any number of sink devices 1404 may be present. Each source device 1402 may form a separate piconet with relay device 1412. Furthermore, relay device 1412 may form any number of one or more piconets with sink devices 1404a-1404n. For example, relay device 1412 may form a separate piconet with each pair of sink devices 1404 (e.g., such as a pair of sink devices formed by sink devices 1404a and 1404b, and a pair of sink devices formed by sink devices 1404m and 1404n). For instance, each pair of sink devices 1404 may be a set of earphones worn by a separate person. Relay device 1412 receives content (e.g., audio and/or video) from source devices 1402a-1402n, and forwards the received content to sink devices 1404a-1404n, in any combination.

Referring back to FIG. 14, in embodiments, source device 1402 transmits a first communication signal that includes content (e.g., audio and/or video) to relay device 1412. Relay device 1412 transmits one or more communication signals that include the received content to sink devices 1404a and 1404b, which output the content in a synchronized manner. In an embodiment, source device 1402 can be a conventional source device (e.g., a cell phone, etc.) that does not include synchronization functionality described herein. In an embodiment, relay device 1412 includes synchronization functionality, which enables the outputs of sink devices 1404a and 1404b to be synchronized.

Figure 16:
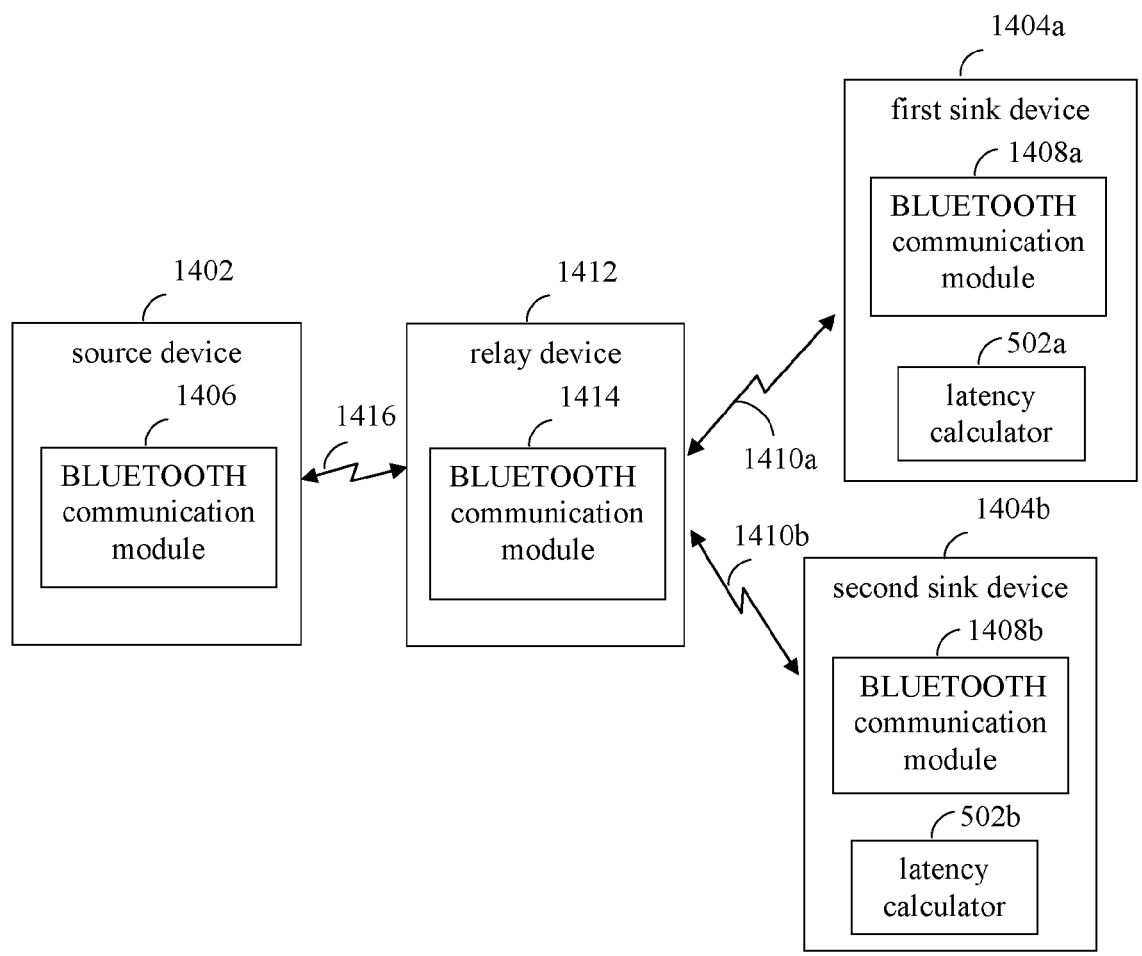

Various techniques may be used to synchronize the content output by sink devices 1404a and 1404b. For example, FIG. 16 shows an example BLUETOOTH wireless communication system 1600, which is an example of system 1400 shown in FIG. 14, according to an embodiment of the present invention. As shown in FIG. 16, first and second sink devices 1404a and 1404b may include latency calculators 502a and 502b, respectively. Latency calculators 502a and 502b may be used to synchronize the output of content by sink devices 1404a and 1404b in a manner as described in detail further above. For example, relay device 1412 may be configured to receive source clock timestamps from source device 1402, and to forward the source clock timestamps to first and second sink devices 1404a and 1404b. First and second latency calculators 502a and 502b of sink devices 1404a and 1404b use the received source clock timestamps to provided synchronized output content, as described in detail further above (e.g., with respect to flowchart 600 shown in FIG. 6). Further synchronization techniques may be used, including those described elsewhere herein or otherwise known.

For instance, in another embodiment, rather than receiving and forwarding source clock timestamps from source device 1402 to latency calculators 502 in sink devices 1404 as shown in FIG. 16, relay device 1412 may include a timestamp calculator, and sink devices 1404a and 1404b may each include a sync offset calculator, which enable synchronized content output. Examples of such an embodiment are described in detail further below.

Figure 17:
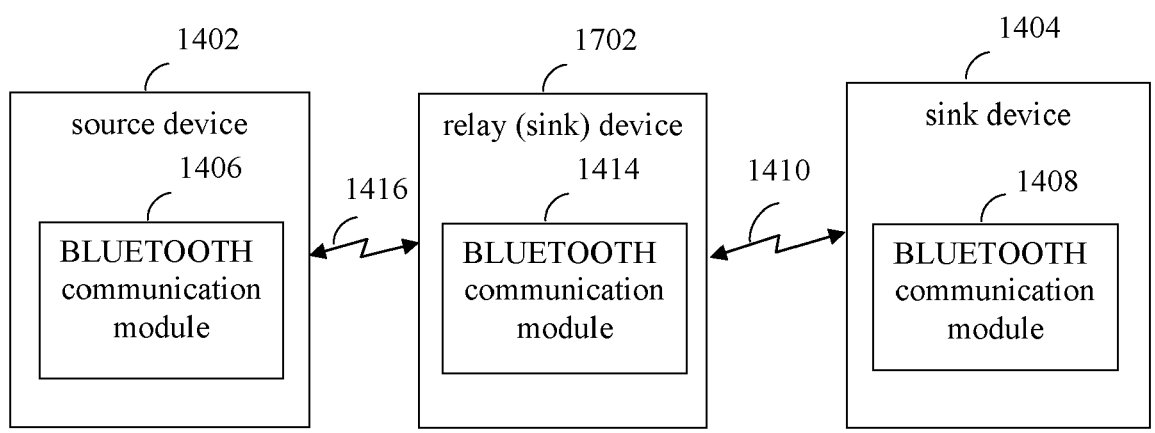

FIG. 17 shows an example BLUETOOTH wireless communication system 1700, which is another example of system 1400 shown in FIG. 14, according to an embodiment of the present invention. As shown in FIG. 17, system 1700 includes source device 1402, a relay device 1702, and a sink device 1404. Relay device 1702 is similar to relay device 1412 shown in FIG. 14, including the relay functionality of relay device 1412. Furthermore, relay device 1702 includes sink functionality of a sink device 1404, being configured to output content in a similar manner to a sink device. In the embodiment of FIG. 17, source device 1402 transmits a first communication signal that includes content (e.g., audio and/or or video) to relay device 1702. Relay device 1702 transmits a communication signal that includes the received content to sink device 1404. Furthermore, relay device 1702 outputs the content in a synchronized manner with sink device 1404.

Figure 18:
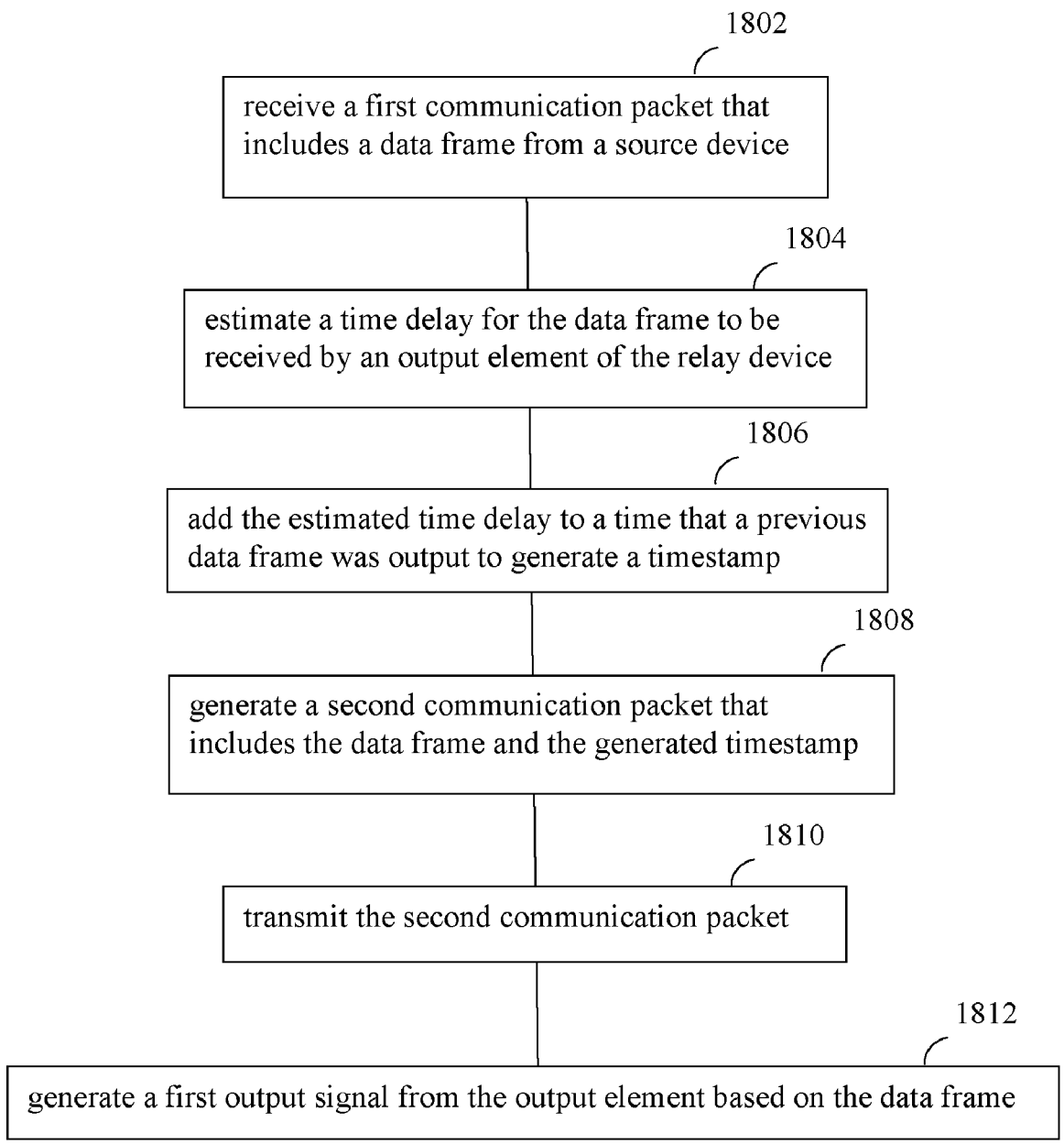
FIG. 18 shows a flowchart providing a process for a relay device, according to an example embodiment of the present invention.
Figure 19:
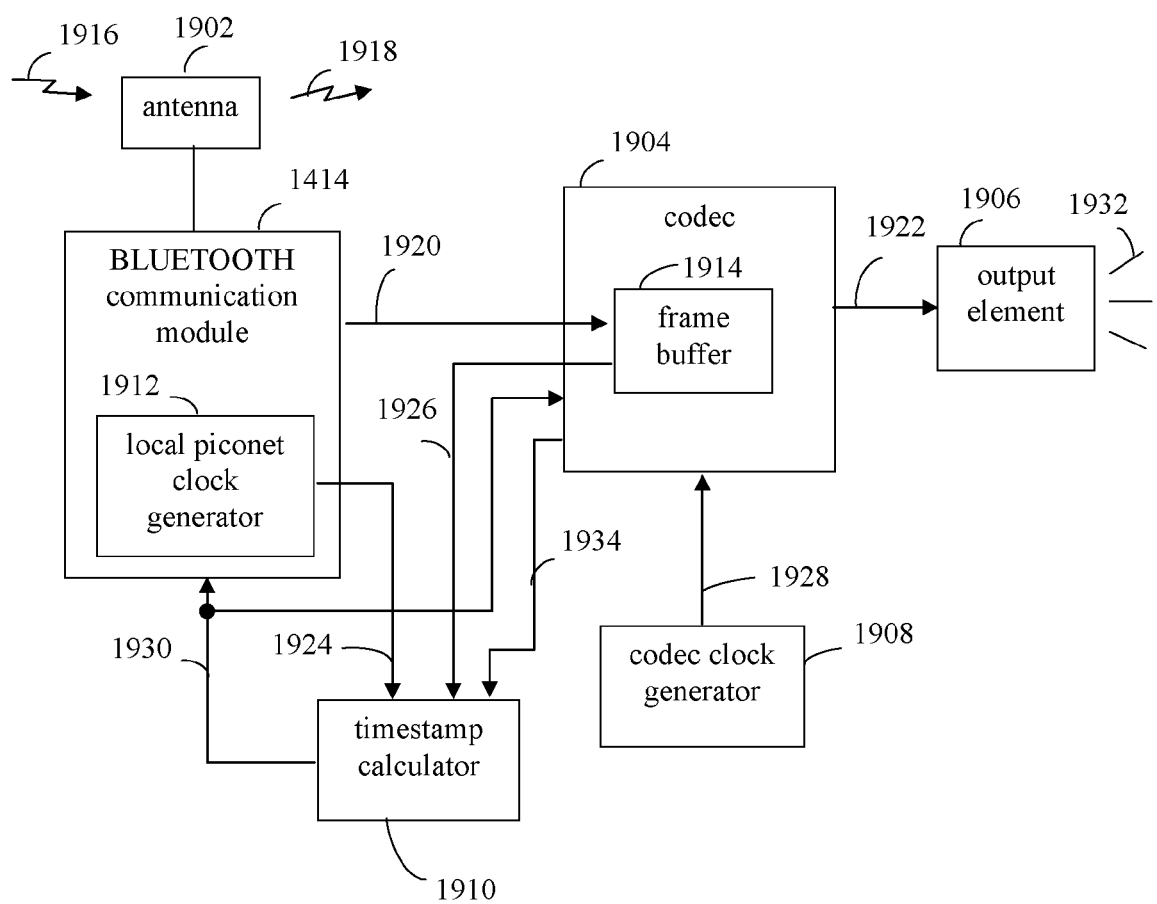
FIG. 19 shows a block diagram of an example relay device, according to an embodiment of the present invention.

FIG. 18 shows a flowchart 1800 providing a process for a relay device that also functions as a sink device, such as relay device 1702 shown in FIG. 17, according to an example embodiment of the present invention. Flowchart 1800 is described below with respect to FIG. 19, for illustrative purposes. FIG. 19 shows a block diagram of a relay device 1900, which is an example of relay device 1702, according to an embodiment of the present invention. As shown in FIG. 19, relay device 1900 includes an antenna 1902, BLUETOOTH communication module 1414, a codec 1904, an output element 1906, a timestamp calculator 1910, and a codec clock generator 1908. Other structural and operational embodiments will be apparent to persons skilled in the relevant art(s) based on the following discussion.

Flowchart 1800 begins with step 1802. In step 1802, a first communication packet that includes a data frame is received from a source device. For example, as shown in FIG. 19, antenna 1902 receives a first communication packet 1916. First communication packet 1916 may be received from source device 1402 shown in FIG. 14. First communication packet 1916 includes a data frame of any size and format, which may include audio, video, and/or other type of media data. For example, the data frame may be a portion of an audio or video data stream provided by source device 1402 in a stream of communication packets similar to first communication packet 1916. BLUETOOTH communication module 1414 receives first communication packet 1916 from antenna 1902. BLUETOOTH communication module 1414 may be configured in any manner described elsewhere herein or otherwise known, such as being configured as shown in FIG. 9 for BLUETOOTH communication module 108. In an audio embodiment, first communication packet 1916 may be received in an A2DP channel format.

In step 1804, a time delay is estimated for the data frame to be received by an output element of the relay device. The time delay represents an estimate of the time needed for the data frame received in first communication packet 1916 to be processed (e.g., by codec 1904) and provided to output element 1906 to be output/played (e.g., as audio/sound and/or video image(s)). As shown in FIG. 19, BLUETOOTH communication module 1414 outputs a data frame 1920, which is the data frame received in first communication packet 1916. Data frame 1920 may have the same format, or may be a reformatted version (e.g., by BLUETOOTH communication module 1414) of the data frame received in first communication packet 1916. Data frame 1920 is received by codec 1904.

As shown in the example of FIG. 19, codec 1904 includes a frame buffer 1914. Data frame 1920 is received by frame buffer 1914, and thereby enters a queue of data frames stored in frame buffer 1914.

Timestamp calculator 1910 estimates the time delay for data frame 1920 to be output (e.g., "played") by output element 1906. In an embodiment, the time delay may be estimated by determining an amount of time that it will take for data frame 1920 to pass through frame buffer 1914 to be processed and output by codec 1904. As shown in the example of FIG. 19, timestamp calculator 1910 receives a stored frame number 1926 from frame buffer 1914. Stored frame number 1926 indicates a number of data frames currently stored in frame buffer 1914, which may optionally include a data frame that is currently being played by output element 1906 (which may thus be partially stored in frame buffer 1914). In embodiments, stored frame number 1926 may or may not count data frame 1920. Timestamp calculator 1910 stores a frame processing time. The frame processing time is a time for a data frame to be played, and thus is an average time for codec 1904 to process (e.g., decode) a data frame. For example, the frame processing time may be in the 2 millisecond time range (e.g., for an SBC data format) or other range of time. Timestamp calculator 1910 multiplies the stored frame processing time by stored frame number 1926 to determine an estimated time delay for data frame 1920 to be processed.

For example, if twenty-nine data frames are currently stored in frame buffer 1914 and another data frame is currently being played (stored frame number 1926=29 stored data frames+1 data frame being played=30 data frames), and 2.0 milliseconds is the frame processing time, timestamp calculator 1910 may estimate the time delay, Tframebuffer_delay, as follows:

$$\text{Tframebuffer\_delay} = \text{stored frame number } 1926 \times \text{frame processing time}$$
$$= 30 \text{ data frames} \times$$
$$2.0 \text{ milliseconds per data frame}$$
$$= 60.0 \text{ milliseconds}$$

Equation 3

Thus, in this example, it may take 60.0 milliseconds for data frame 1920 to be decoded and output by codec 1904, and thereby received by output element 1906.

In step 1806, the estimated time delay is added to a time a previous data frame was output to generate a timestamp. As shown in FIG. 19, timestamp calculator 1910 receives a piconet clock signal 1924 from a local piconet clock generator 1912 of BLUETOOTH communication module 1414. Piconet clock signal 1924 is a current clock value of local piconet clock generator 1912, providing a current piconet time. Timestamp calculator 1910 also receives a previous codec frame complete signal 1934 from codec 1904. Previous codec frame complete signal 1934 provides an indication that codec 1904 has finished playing out a most recent data frame to output element 1906. Timestamp calculator 1910 determines a time at which the previous data frame is complete being played out by codec 1904 by determining a current time indicated by piconet clock signal 1924 when an indication that the previous data frame is complete is received on signal 1934. Timestamp calculator 1910 adds the estimated time delay determined in step 1804 to the determined time at which the previous data frame is complete to determine a timestamp, which is output by timestamp calculator 1910 as timestamp 1930.

For example, in an embodiment, timestamp calculator 1910 may perform the following equation to determine the timestamp, Tstamp:

$$\text{Tstamp} = \text{Tframebuffer\_delay} + \text{Tprevious\_codec\_frame\_complete}$$

Equation 4 where:
Tprevious_codec_frame_complete=time on piconet clock signal 1924 at which an indication that the previous data frame is complete is received on signal 1934.

Note that in embodiments, timestamp calculator 1910 may be implemented in hardware, software, firmware, or any combination thereof. For example, in embodiments, timestamp calculator 1910 may be implemented as software code that runs in a processor of relay device 1900, as digital logic, etc.

In step 1808, a second communication packet is generated that includes the data frame and the generated timestamp. For example, in an embodiment, BLUETOOTH communication module 1414 generates a second communication packet that includes a data frame (e.g., data frame 1920) and timestamp 1930. BLUETOOTH communication module 1414 may generate the second communication packet in a manner known to persons skilled in the relevant art(s).

In step 1810, the second communication packet is transmitted. For example, as shown in FIG. 19, antenna 1902 transmits a second communication packet 1918, which is the communication packet generated in step 1808 by BLUETOOTH communication module 1414 that includes timestamp 1930. In an audio embodiment, second communication packet 1918 may be transmitted in an A2DP channel format.

In step 1812, a first output signal is generated from the output element based on the data frame. For example, in an embodiment, data frame 1920 passes through frame buffer 1914, and is processed (e.g., decoded) by codec 1904. Codec 1904 is similar to codec 904 described above with respect to FIG. 9. For example, codec 1904 may perform bit stream decoding of data, including data frame 1920, to generate an output signal 1922. Furthermore, depending on the implementation of output element 1906, which receives output signal 1922, codec 1904 may perform a digital-to-analog conversion (e.g., may include a digital-to-analog converter (DAC)), to convert the decoded data to analog form.

Codec clock generator 1908 generates a codec clock signal 1928 received by codec 1904. Codec 1904 generates output signal 1922 according to codec clock signal 1928. The rate of codec clock signal 1928 enables data frames to be processed in the amount of time indicated by the frame processing time used by timestamp calculator 1910 to generate timestamp 1930.

As shown in FIG. 19, codec 1904 generates output signal 1922, which is received by output element 1906. Output element 1906 generates a media output signal 1932, which may be audio (sound), video images, or other type of media output signal. In an embodiment, output element 1906 is a speaker that receives output signal 1922 as an analog audio signal. In another embodiment, output element 1906 is a display device, such as a high-definition display device that receives output signal 1922 as a digital data stream. For example, output element 1906 may have a digital interface, such as an HDMI (high-definition multimedia interface) interface configured for digital audio/video data. Thus, in embodiments, output signal 1922 may be a digital or analog signal, depending on the particular implementation of output element 1906.

Timestamp 1930 is configured to be used by a sink device that receives second communication packet 1918 to synchronize a second output signal generated by an output element of the sink device with output signal 1932. In one embodiment, codec 1904 generates output signal 1922 for data frame 1920 as soon as data frame 1920 passes through frame buffer 1914. In another embodiment, codec 1904 may be configured to hold off outputting output signal 1922 until the time indicated by timestamp 1930. In either manner, output signal 1922 is synchronized with an output signal generated by an output element of another sink device, which provides an output signal corresponding to output signal 1922 at the time indicated by timestamp 1930.

The embodiment of FIG. 19 enables timestamps to be generated that enable sink devices to be synchronized to the rate of codec 1904. Variations in the rate of codec 1904 will be reflected in timestamp 1930, enabling sink devices to remain synchronized with relay device 1900 even if the rate of codec 1904 does vary (e.g., due to interrupt jitter, etc.).

Figure 20:
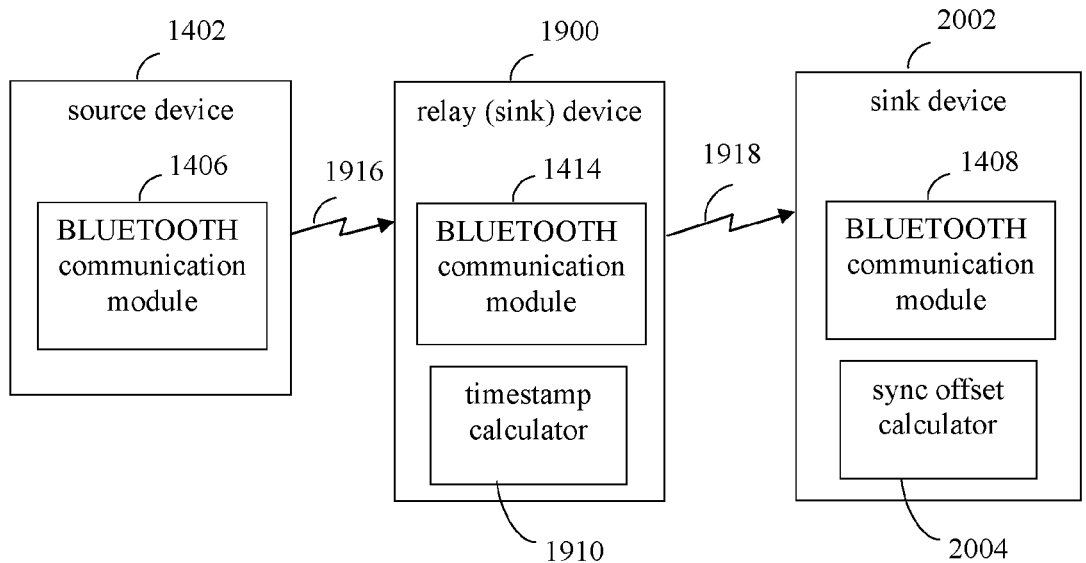
FIG. 20 shows an example BLUETOOTH wireless communication system, according to an embodiment of the present invention.

In embodiments, a sink device may receive second communication packet 1918, and may output a media signal that is synchronized with media output signal 1932 of relay device 1900. For instance, FIG. 20 shows an example BLUETOOTH wireless communication system 2000, which is an example of system 1700 shown in FIG. 17, according to an embodiment of the present invention. As shown in FIG. 20, system 2000 includes source device 1402, relay device 1900, and a sink device 2002. Source device 1402 includes BLUETOOTH communication module 1406. Relay device 1900 includes BLUETOOTH communication module 1414 and timestamp calculator 1910. Sink device 2002 includes BLUETOOTH communication module 1408 and a sync offset calculator 2004.

As shown in FIG. 20 (and described above with respect to FIG. 19), relay device 1900 receives first communication packet 1916 from source device 1402, and generates second communication packet 1918. Second communication packet 1918 is received by sink device 2002. Second communication packet 1918 includes a data frame (e.g., data frame 1920 of FIG. 19) and a timestamp (e.g., timestamp 1930). Sink device 2002 outputs (e.g., "plays") the received data frame from one or more output elements of sink device 2002. Sync offset calculator 2004 receives timestamp 1930, and adjusts a rate at which data frames are output by output elements of sink device 2002 according to timestamp 1930, so that data frames output by sink device 2002 are synchronized with data frames output by relay device 1900.

Figure 21:
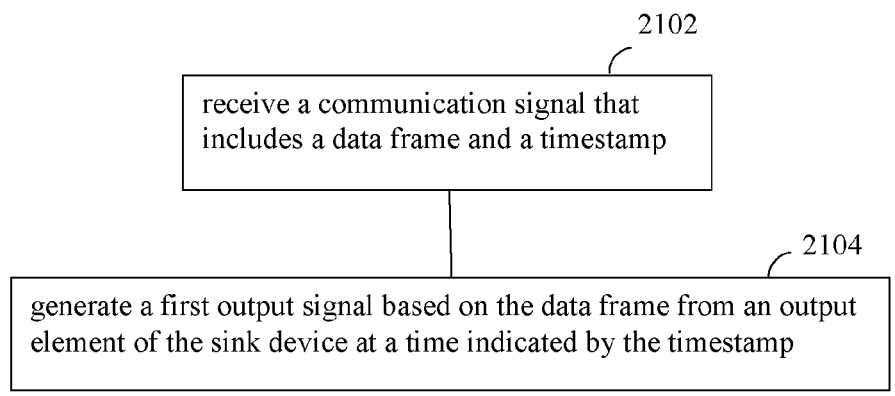
FIG. 21 shows a flowchart providing a process for a sink device, according to an example embodiment of the present invention.
Figure 22:
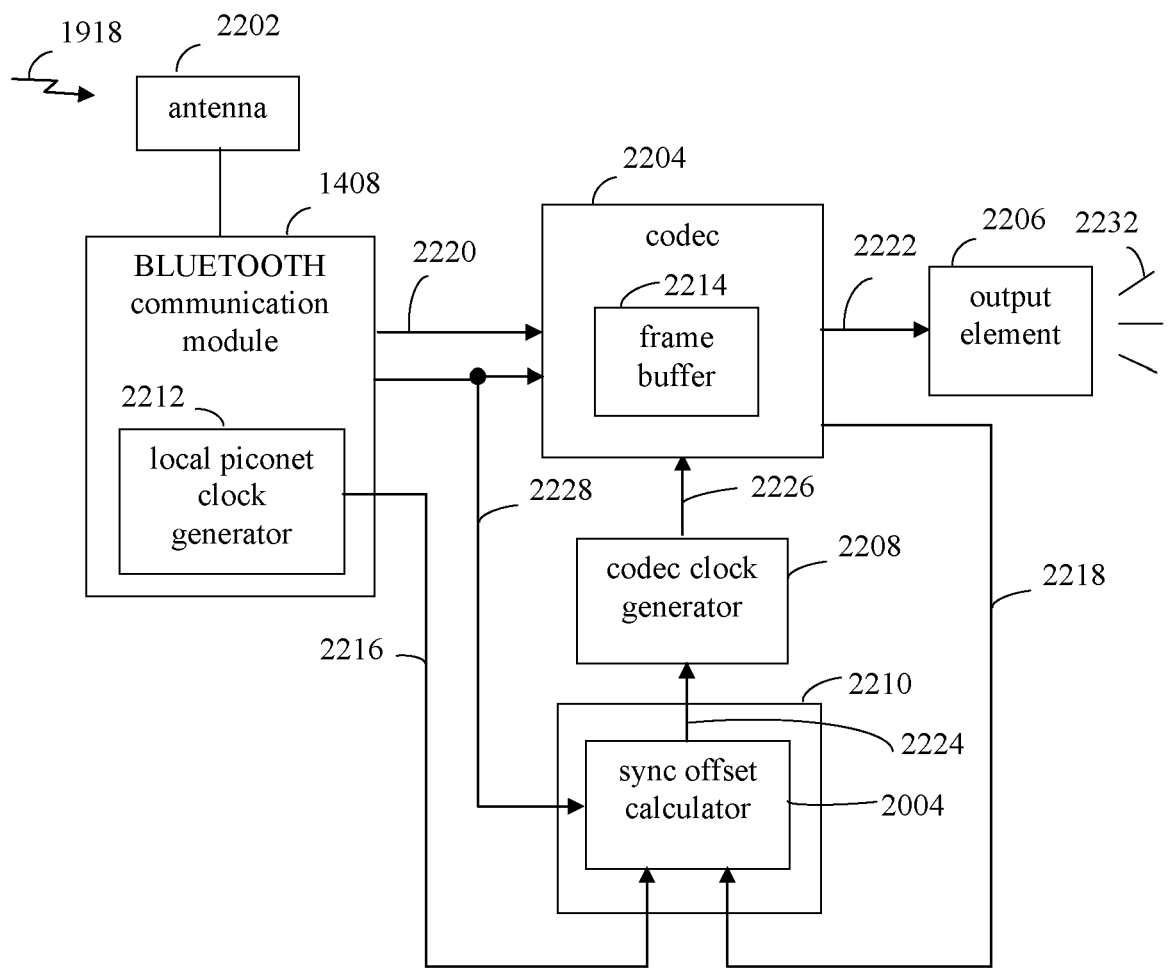
FIG. 22 shows a block diagram of an example sink device, according to an embodiment of the present invention.

For instance, FIG. 21 shows a flowchart 2100 providing a process for a sink device, such as sink device 2002 shown in FIG. 20, according to an example embodiment of the present invention. Flowchart 2100 is described below with respect to FIG. 22, for illustrative purposes. FIG. 22 shows a block diagram of a sink device 2200, which is an example of sink device 2002, according to an embodiment of the present invention. As shown in FIG. 22, sink device 2200 includes an antenna 2202, BLUETOOTH communication module 1408, a codec 2204, an output element 2206, a codec clock generator 2208, and a processing module 2210. Processing module 2210 includes sync offset calculator 2004. In an alternative embodiment, codec 2204 may include sync offset calculator 2004. Other structural and operational embodiments will be apparent to persons skilled in the relevant art(s) based on the following discussion.

Flowchart 2100 begins with step 2102. In step 2102, a communication signal is received that includes a data frame and a timestamp. For example, as shown in FIG. 22, antenna 2202 receives second communication packet 1918 from relay device 1900 shown in FIG. 19. Second communication packet 1918 may include data frame 1920 and timestamp 1930. BLUETOOTH communication module 1408 receives second communication packet 1918 from antenna 2202. BLUETOOTH communication module 1408 may be configured in any manner described elsewhere herein or otherwise known, such as being configured as shown in FIG. 9 for BLUETOOTH communication module 108. BLUETOOTH communication module 1408 extracts data frame 1920 and timestamp 1930 from second communication signal 1918, and generates extracted data frame 2220 and timestamp 2228.

In step 2104, a first output signal is generated based on the data frame from an output element of the sink device at a time indicated by the timestamp. For example, in an embodiment, codec 2204 receives extracted data frame 2220 (which includes data frame 1920). Codec 2204 is configured generally similarly to codec 1904 shown in FIG. 19. Codec clock generator 2208 generates a codec clock signal 2226 received by codec 2204. In an embodiment, a rate of codec clock signal 2226 is substantially equal to the rate of codec clock signal 1928, so that relay device 1900 and sink device 2200 have similar frame processing times. Data frame 2220 is input to a frame buffer 2214 of codec 2204. Data frame 2220 passes through frame buffer 2214, and is processed (e.g., decoded) by codec 2204.

As shown in FIG. 22, codec 2204 generates output signal 2222, which is received by output element 2206. Output element 2206 may be generally similar to output element 1906 of relay device 1900. Output element 2206 generates a media output signal 2232, which may be audio (e.g., sound), video images, or other media output signal. Timestamp 2228 (which includes timestamp 1930) is configured to be used to synchronize media output signal 2232 generated by output element 2206 of sink device 2200 with output signal 1932 generated by output element 1906 of relay device 1900. In an embodiment, codec 2204 outputs output signal 2222 at a time indicated by timestamp 2228. In this manner, media output signal 2232 is synchronized with media output signal 1932 generated by output element 1906.

As shown in FIG. 22, sync offset calculator 2004 receives timestamp 2228, a piconet clock signal 2216 generated by a local piconet clock generator 2212 of BLUETOOTH communication module 1408, and a frame complete signal 2218 from codec 2204. Piconet clock signal 2216 is synchronized with piconet clock signal 1912 of FIG. 19 (which may be considered a master piconet clock signal with regard to piconet clock signal 2216). Codec 2204 generates frame complete signal 2218 to provide an indication when codec 2204 has completed generating output signal 2222 for a data frame (received on data frame 2220). When sync offset calculator 2004 receives a frame complete indication on frame complete signal 2218, sync offset calculator 2004 is configured to compare timestamp 2228 (corresponding to the output data frame) to a time indicated by piconet clock signal 2216. In this manner, sync offset calculator 2004 determines whether the data frame was output by codec 2204 at the time indicated by timestamp 2228 (to be synchronized with the data frame being output by relay device 1900). Sync offset calculator 2004 determines a lack of synchronization if timestamp 2228 is a time value that is greater or less than the time indicated by piconet clock signal 2216. In such a situation, sync offset calculator 2004 is configured to cause codec clock generator 2208 to modify a rate of codec clock signal 2226. Sync offset calculator 2004 generates a codec clock modifier signal 2224, which is received by codec clock generator 2208. Codec clock generator 2208 modifies the rate of codec clock signal 2226 according to signal 2224. Modification of the rate of codec clock signal 2226 modifies a timing of output of the next data frame from codec 2204, which may be used to improve a synchronization of data frames being output (e.g., played) by relay device 1900 and sink device 2200.

Note that in an embodiment, sync rate calculator 2004 may include a moving average filter. The moving average filter may store modifications to the rate of codec clock signal 2226 determined by sync offset calculator 2004, and may filter (e.g., average) the determined modifications over time. The filtered determined modifications may be provided to codec clock generator 2008 over codec clock modifier signal 2224. Such filtering may be used to avoid sudden drastic changes to the rate of codec clock signal 2226 by sync rate calculator 2004, by smoothing out jitter caused by codec interrupt frequency variations and/or by other operating system scheduling effects.

Processing module 2210 may include hardware, software, firmware, or any combination thereof to perform its functions. Processing module 2210 may be implemented in a similar manner as any processing module described elsewhere herein, for example. Sync offset calculator 2004 may include hardware, software, firmware, or any combination thereof to perform its functions. For example, sync offset calculator 2004 may be implemented in digital logic, software or firmware that runs in a processor, and/or in any other implementation.

Thus, relay device 1702 and source device 1404 shown in FIG. 17 may be configured to generate synchronized outputs. In an example audio embodiment, relay device 1702 may be a first earphone/earbud that provides right (or left) channel audio, and sink device 1404 may be a second earphone/earbud that provides left (or right) channel audio synchronized with the audio output by relay device 1702.

In an embodiment, the synchronization technique described above enables more precise synchronization than can be conventionally achieved. For example, the BLUETOOTH A2DP protocol enables timestamps with approximately 15 microsecond resolution. Embodiments of the present invention provide for non-standard timestamps (e.g., timestamp 1930 of FIG. 19) which can have 1 microsecond resolution. Thus, output signals can be more closely synchronized than in conventional A2DP protocol communications.

The embodiments described above achieve relative latency synchronization between a relay device and one or more sink devices. The latency of a relay device is provided to one or more sink devices in the form of a timestamp, which the sink devices use to synchronize with the relay device. In a further embodiment, absolute latency synchronization may be achieved between a relay device and one or more sink devices. Absolute latency synchronization may be achieved by monitoring an actual absolute level of data frames stored in the frame buffer of the relay device (e.g., frame buffer 1914 of relay device 1900). The level of data frames stored in the frame buffer may be tuned (e.g., increased or decreased) based on various factors, such as RF signal quality (e.g., with regard to second communication signal 1918), signal strength, and/or other factors. For example, if a sink device is relatively close to a relay device, the frame buffer of the relay device can be tuned to contain a lower number of data frames, as lower latency is more tolerable (e.g., due to lower interference, etc.). If the sink device is moved further away from the relay device, the frame buffer of the relay device can be tuned to contain a higher number of data frames, as higher latency may be desirable (e.g., due to increased interference, etc.) to avoid draining the frame buffer of the relay device of data frames.

Absolute latency synchronization may be desirable in various applications. For example, absolute latency synchronization may be desirable when audio and video output elements are present in a sink device that are desired to be synchronized with audio and video output elements of a relay device. In such a situation, overall latency may be desired to be maintained at a relatively low level (e.g., 43 ms between all relay and sink devices (e.g. earbuds) to minimize lip sync effects, or even to align with custom delayed video.

In some embodiments, sink device 1404 shown in FIG. 17 may be configured differently than relay device 1702, such as in the embodiments shown in FIGS. 19 and 22. Alternatively, sink device 1404 may be configured similarly to relay device 1702. For example, in an embodiment, sink device 1404 may also be configured as a relay/sink device (e.g., being configured relay device 1900 shown in FIG. 19). In this manner, relay device 1702 may function as a source device with respect to sink device 1404, while sink device 1404, when configured as a relay/sink device, may function as a sink device with respect to relay device 1702, and may optionally function as a source device with respect to a subsequent sink device.

As described above, timestamp calculator 1910 may be used to enable synchronization of the outputs of relay device 1702 and sink device 1404. In another embodiment, latency calculator 502 described further above may be used to provide synchronization of the outputs of relay device 1702 and sink device 1404.

In another embodiment, timestamp calculator 1910 may be used to enable synchronization of the outputs of sink devices 1404a and 1404b. For example, relay device 1412 shown in FIG. 14, although not configured as a sink device, may include a timestamp calculator similar to timestamp calculator 1910. The timestamp calculator may be configured to estimate a time delay for a data frame to be decoded by a codec (e.g., a codec of a sink device 1404), and to add the estimated time delay to an estimated time that a previous data frame was output by a codec (e.g., a codec of a sink device 1404) to generate a timestamp. The timestamp is transmitted to first and second sink devices 1404a and 1404b, which may receive the transmitted timestamp, and may synchronize their output signals based on the timestamp. For example, in an embodiment, sink devices 1404a and 1404b may both be configured similarly to sink device 2200 shown in FIG. 22.

Example Software Embodiments

In this document, the terms "computer program medium" and "computer usable medium" are used to generally refer to media such as a removable storage unit, a hard disk installed in hard disk drive, and signals (i.e., electronic, electromagnetic, optical, or other types of signals capable of being received by a communications interface). These computer program products are means for providing software to a computer system and to storing software in a computer system or other device. The invention, in an embodiment, is directed to such computer program products.

In an embodiment where aspects of the present invention are implemented using software/firmware, the software/firmware may be stored in a computer program product and loaded into a computer system or other device using a removable storage drive, hard drive, or communications interface. The computer system or other device may execute the software/firmware from a storage such as a hard drive or memory device (e.g., a ROM device such as an electrically erasable ROM, electrically programmable ROM, a RAM device such as a static RAM, dynamic RAM, etc.). This control logic software/firmware, when executed by a processor, causes the processor to perform the functions of the invention as described herein.

According to an example embodiment, a sink device may execute computer-readable instructions to calculate and adjust for latency as further described elsewhere herein, and as may be recited in the claims appended hereto. In another example embodiment, a relay device may execute computer-readable instructions to calculate a timestamp to be used by one or more sink devices for synchronization purposes, as further described elsewhere herein, and as may be recited in the claims appended hereto. A sink device may execute computer-readable instructions to use the calculated timestamp for synchronization purposes, as further described elsewhere herein, and as may be recited in the claims appended hereto.

Conclusion

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A method in a relay device, comprising:
   receiving a first communication packet that includes a data frame from a source device;
   estimating a time delay for the data frame to be received by an output element of the relay device, wherein said estimating is based on a stored frame number that includes a number of data frames stored in a frame buffer and further includes an additional data frame when a data frame is currently being played by the output element;
   adding the estimated time delay to a time that a previous data frame was output to generate a timestamp;
   generating a second communication packet that includes the data frame and the generated timestamp;
   transmitting the second communication packet; and
   generating a first output signal from the output element based on the data frame;
   wherein the generated timestamp is configured to be used by a sink device that receives the second communication packet to synchronize a second output signal generated by an output element of the sink device with the first output signal.

2. The method of claim 1, wherein said estimating comprises:
   multiplying a frame processing time by the stored frame number to determine the estimated time delay.

3. The method of claim 2, wherein said generating a first output signal from the output element based on the data frame comprises:
   receiving the data frame in the frame buffer;
   processing the data frame after the data frame is output from the frame buffer; and
   generating the first output signal from the output element based on the processed data frame.

4. The method of claim 1, further comprising:
   establishing a BLUETOOTH piconet that includes the relay device and the sink device; and
   synchronizing a clock signal generator of the relay device with a clock signal generator of the sink device.

5. The method of claim 1, wherein the first and second output elements are speakers.

6. The method of claim 5, wherein the relay device is a first earphone and the sink device is a second earphone.

7. A relay device, comprising:
   a communication module configured to enable wireless communications, wherein the communication module is configured to receive a first communication packet that includes a data frame from a remote source device;
   a codec that includes a frame buffer configured to receive the data frame, wherein the codec is configured to decode the data frame after passing through the frame buffer;
   a timestamp calculator configured to estimate a time delay for the data frame to be decoded by the codec, and to add the estimated time delay to a time that a previous data frame was output by the codec to generate a timestamp, wherein the communication module is configured to transmit a second communication packet that includes the data frame and the generated timestamp; and
   an output element configured to receive the decoded data frame and to generate a first output signal based on the decoded frame data;
   wherein the timestamp calculator is configured to estimate the time delay based on a stored frame number that includes a number of data frames stored in the frame buffer and further includes an additional data frame when a data frame is currently being played by the output device.

8. The relay device of claim 7, wherein the generated timestamp is configured to be used by a sink device that receives the second communication packet to synchronize a second output signal generated by an output element of the sink device with the first output signal.

9. The relay device of claim 7, wherein the timestamp calculator is configured to multiply a frame decoding time of the codec by the stored frame number to determine the estimated time delay.

10. The relay device of claim 7, wherein the communication module is a BLUETOOTH communication module.

11. The relay device of claim 8, wherein output element of the relay device and the output element of the sink device are speakers.

12. The relay device of claim 11, wherein the relay device is a first earphone and the sink device is a second earphone.

13. A relay device, comprising:
    a communication module configured to enable wireless communications, wherein the communication module is configured to receive a first communication packet that includes a data frame from a remote source device; and
    a timestamp calculator configured to estimate a time delay for the data frame to be decoded by a codec, and to add the estimated time delay to a time that a previous data frame was output by a codec to generate a timestamp, wherein the communication module is configured to transmit a second communication packet that includes the data frame and the generated timestamp;
    wherein the timestamp calculator is configured to estimate the time delay based on a stored frame number that includes a number of data frames stored in a frame buffer and further includes an additional data frame when a data frame is currently being output by the relay device; and
    wherein the generated timestamp is configured to be used by a plurality of sink devices that receive the second communication packet to synchronize output signals generated by output elements of the sink devices.

14. The relay device of claim 13, wherein the communication module is configured to receive a third communication packet that includes a second data frame from a second source device;
- wherein the timestamp calculator is configured to estimate a second time delay for the second data frame to be decoded by a codec, and to add the estimated second time delay to a second time that a second previous data frame was output by a codec to generate a second timestamp, wherein the communication module is configured to transmit a fourth communication packet that includes the second data frame and the generated second timestamp; and
- wherein the generated second timestamp is configured to be used by the plurality of sink devices that receive the fourth communication packet to synchronize output signals generated by output elements of the sink devices.

15. The relay device of claim 13, wherein the plurality of sink devices includes a right audio earphone and a left audio earphone.

16. The relay device of claim 13, wherein the plurality of sink devices includes a plurality of pairs of earphones, wherein each pair includes a right audio earphone and a left audio earphone.

17. A method in a relay device, comprising:
- receiving a first communication packet that includes a data frame from a source device;
- estimating a time delay for the data frame to be received by an output element of a remote sink device, wherein said estimating is based on a stored frame number that includes a number of data frames stored in a frame buffer and further includes an additional data frame when a data frame is currently being played by the output element;
- adding the estimated time delay to a time that a previous data frame was output by a codec to generate a timestamp;
- generating a second communication packet that includes the data frame and the generated timestamp; and
- transmitting the second communication packet;
- wherein the generated timestamp is configured to be used by a plurality of sink devices that receive the second communication packet to synchronize output signals generated by output elements of the sink devices.

18. The method of claim 17, further comprising:
- receiving a third communication packet that includes a second data frame from a second source device;
- estimating a second time delay for the second data frame to be received by an output element of the remote sink device;
- adding the estimated second time delay to a second time that a second previous data frame was output by a codec to generate a second timestamp; and
- generating a fourth communication packet that includes the second data frame and the generated second timestamp;
- wherein the generated second timestamp is configured to be used by the plurality of sink devices that receive the fourth communication packet to synchronize output signals generated by output elements of the sink devices.

19. The method of claim 17, wherein the plurality of sink devices includes a right audio earphone and a left audio earphone.

20. The method of claim 17, wherein the plurality of sink devices includes a plurality of pairs of earphones, wherein each pair includes a right audio earphone and a left audio earphone.

* * * * *

UNITED STATES PATENT AND TRADEMARK OFFICE
CERTIFICATE OF CORRECTION

PATENT NO. : 8,320,410 B2
APPLICATION NO. : 12/125739
DATED : November 27, 2012
INVENTOR(S) : Mattias Per Agren It is certified that error appears in the above-identified patent and that said Letters Patent is hereby corrected as shown below:

On the Title page, in item (74), "Attorney, Agent or Firm", in column 2, line 1, delete "Piala" and insert -- Fiala --, therefor.

In the Claims:
In column 26, line 28, In Claim 7, delete "device." and insert -- element. --, therefor.

Signed and Sealed this
Ninth Day of April, 2013

Teresa Stanek Rea
*Acting Director of the United States Patent and Trademark Office*